United States Patent [19]

Hommes et al.

[11] Patent Number: 5,072,493
[45] Date of Patent: Dec. 17, 1991

[54] APPARATUS FOR DRAWING PLASTIC FILM IN A TENTER FRAME

[75] Inventors: William J. Hommes, Hockessin; John J. Keegan, Jr., Wilmington, both of Del.

[73] Assignee: E. I. Du Pont de Nemours and Company, Wilmington, Del.

[21] Appl. No.: 611,634

[22] Filed: Nov. 13, 1990

Related U.S. Application Data

[62] Division of Ser. No. 209,910, Jun. 22, 1988.

[51] Int. Cl.⁵ .............................................. D06C 3/08
[52] U.S. Cl. ...................................................... 26/72
[58] Field of Search .......................... 26/72, 73, 89, 92

[56] References Cited

U.S. PATENT DOCUMENTS

| | | | |
|---|---|---|---|
| 2,698,967 | 1/1955 | Reichel | 26/92 X |
| 3,148,409 | 9/1964 | Brückner | 26/73 |
| 3,150,433 | 9/1964 | Kampf | 26/73 |
| 3,261,903 | 7/1966 | Carr | 26/89 X |
| 3,803,466 | 4/1974 | Starkey | 318/135 |
| 3,890,421 | 6/1975 | Habozit | 26/72 X |
| 3,916,491 | 11/1975 | Kampf | 26/72 |
| 3,930,098 | 12/1975 | Araki et al. | 26/72 X |
| 3,932,919 | 1/1976 | Hutzenlaub | 26/73 |
| 4,384,392 | 5/1983 | Allen | 26/72 |

FOREIGN PATENT DOCUMENTS 2317076 2/1977 France .
48-38779 10/1973 Japan .

OTHER PUBLICATIONS

Article from the 28th IEEE Vehicular Technology Conference, Denver, Colo., Mar. 22-24, 1978, entitled, "The Evolution of a Linear Induction Motor People Mover System", by William Watkins and Mel Black, WED Enterprises, Walt Disney Productions.

*Primary Examiner*—Werner H. Schroeder
*Assistant Examiner*—John J. Calvert

[57] ABSTRACT

Apparatus and method for producing a novel drawn film by propelling individual carriages along opposed loops from a first speed abutted in stacks in carriage collection sections to a second speed space apart in a drawing section of a tenter frame and to a third speed in stack forming sections where the carriages return to the first speed in the stacks. First primaries positioned adjacent one part of each loop develop electromagnetic waves for engaging synchronous secondaries attached to active carriages to provide controlled spacing of such carriages, and second primaries adjacent another part of the loop develop other electromagnetic waves for engaging hysteresis secondaries attached to active and to passive carriages to provide controlled abutting of the carriages.

2 Claims, 21 Drawing Sheets

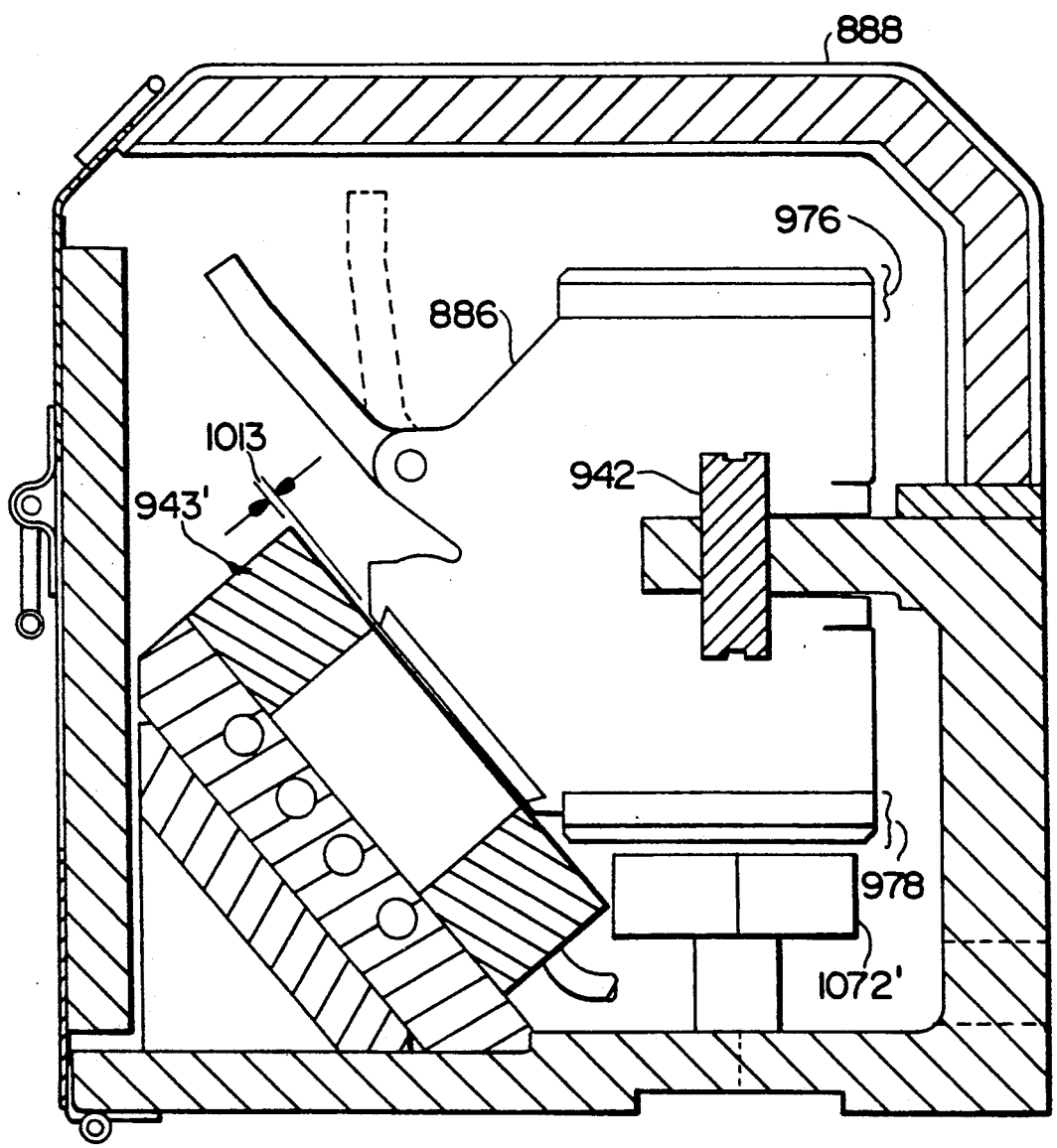

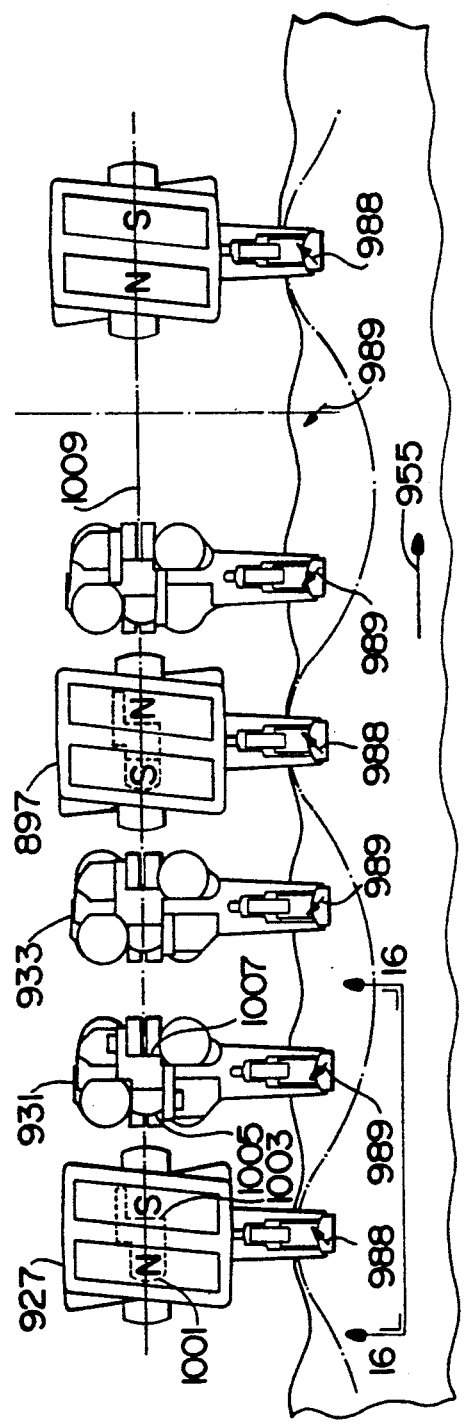

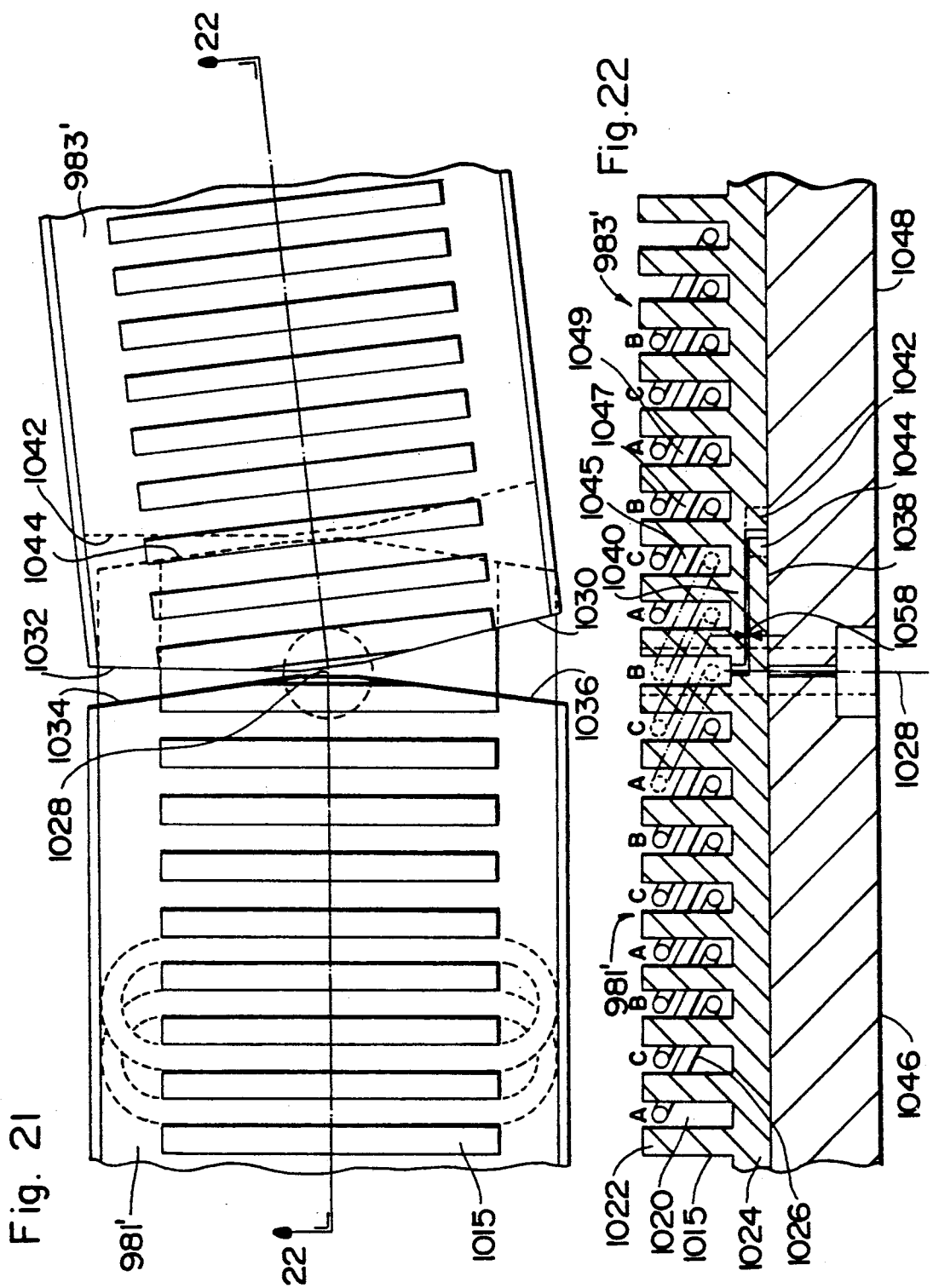

APPARATUS FOR DRAWING PLASTIC FILM IN A TENTER FRAME

This is a division of application Ser. No. 07/209,910, filed June 22, 1988.

BACKGROUND OF THE INVENTION

1. Field of the Invention

The field of art to which this invention pertains is tenter frames for drawing plastic films and, more particularly, it is directed to methods and apparatus for drawing such films using linear motors.

Specifically, this invention involves drawing film by propelling active carriages, with tenter clips attached, with synchronous linear motors. These same motors are also used to propel stacks of these carriages, at controlled speeds, in collection sections prior to entering the tenter frame. Hysteresis linear motors are used to propel the carriages into the stacks, and further provide a means of propelling passive carriages with idler clips attached along the return sides of the tenter frame, after completion of the drawing operation.

2. Description of the Related Art

As just indicated, the method and apparatus of this invention are primarily used to stretch or draw a web of sheet material or film in a tenter frame. The film is drawn in the machine direction (MD) by propelling tenter clips, which grip the film, in pairs along opposed tracks at ever increasing velocities to space the pairs of clips from each other and thereby draw the film longitudinally. Transverse direction (TD) drawing occurs as the clips follow diverging portions of the tracks.

Typical methods for drawing film in this manner are shown in U.S. Pat. No. 3,890,421 to Habozit; in Japanese patent publication 48-38779; and, in the French patent 2,317,076. These patents and publication, however, do not teach the carefully coordinated controls required, in drawing film in accordance with the instant invention. In such invention, pairs of clips which are directly opposite each other, are propelled, while maintaining this opposite positioning, at identical velocities and precise spacings with adjacent, opposed, tenter clip pairs. This operation is accomplished by use of synchronous linear motors.

More specifically, in the tenter frame apparatus and method of the instant invention, two endless tracks guide individual active carriages in loops that are arranged opposite one another with the film passing between the loops. Synchronous secondaries are attached to these carriages to which are also attached tenter clips to grip the edges of the film. Elongated primaries are located opposed to each other on the film drawing or forward side of each loop and are adjacent the synchronous secondaries on the carriages to engage them electromagnetically. In a significant aspect of the invention, each primary includes a plurality of groups of coils with the group of coils in one primary sized to match the opposed groups of coils in the other primary and with each of the opposed groups of coils being electrically joined and defining a single control zone. Power is applied to these control zones to propel opposed pairs of carriages in symmetry through each control zone and from one control zone to the next throughout the tenter frame. The tracks in each loop can diverge as in a conventional tenter frame and simultaneously the carriages gripping the edges of the film can be separated in the MD and TD as the carriages travel along the track. The film is thereby simultaneously biaxially drawn or stretched.

The synchronous secondaries assure that the active carriages will synchronously engage, or lock onto, the electromagnetic wave developed by the primaries resulting from control instructions. Therefore, as long as the carriages are continuously fed to the forward sides of the loops, preferably in stacks being propelled at controlled speeds, and the opposed groups of coils in each control zone simultaneously receive alternating current developed from the same predetermined control instruction, which are simultaneously coordinated with adjacent control zones instructions, the carriages will remain in symmetry as they are continuously propelled along the forward sides of both loops.

The art mentioned above does not show or suggest the method just described.

The Habozit patent, and the French patent, which is related to it, only show an endless loop linear motor system where individually controlled field windings along opposed loops accelerate carriages containing film clips through a tenter oven. The induction secondaries are attached to each carriage to propel them throughout the loops. There is no teaching as to how to achieve symmetry of motion of opposed clips, nor is there any teaching of how to solve the unique problems of controlling a plurality of carriages having synchronous secondaries attached.

The Japanese patent publication 48-38779 only shows an apparatus to propel tenter clips in opposed loops for stretching film using a "short core-type linear motor". No means is provided to insure symmetry of motion of opposed pairs of clips.

The instant invention, by providing this controlled symmetry of motion, offers improvements over the tenter frame art.

This invention further involves the use of linear motors to propel carriages in endless loops from the exit of carriage collection sections, where they move abutted in stacks at a constant synchronous speed, to a second or greater speeds to space the carriages apart, after which such carriages are propelled back into the stacks prior to reaching the entrance of the collection sections. The speed at which the carriages move after contact with the stacks is determined by the speed of the abutted carriages in the carriage collection sections, against which the carriages newly arrived in the stacks are constantly pressing. The carriages move asynchronously after contact with the stacks and prior to reaching the entrance of the collection sections.

The movement of the active carriages into the stacks is controlled by hysteresis secondaries also attached to the carriages. These secondaries are engaged by electromagnetic waves independently developed by zones of linear motor primaries positioned adjacent the hysteresis secondaries. The electromagnetic waves may vary in speed to control acceleration and deceleration of the carriages.

Further, in another aspect of this invention, one or more passive or idler, clips may be placed between each of the active clips, in each loop of the tenter frame, to minimize film edge scalloping as shown, for example, in previously mentioned French patent 2,317,076. The carriages to which these passive clips are attached are unpowered during the film stretching operation. Such passive carriages are initially propelled by abutment with the active carriages having the synchronous secondaries attached thereto. As the active carriages separate to stretch the film, the passive clips are then propelled, on the forward sides of the tenter frame, by their engagement with the moving film.

After the film is released, these carriages are then returned, along with the active carriages, along the return sides of the loops and into the stacks of carriages, prior to movement back into the film processing section of the tenter frame. This is accomplished by attaching hysteresis secondaries to the passive carriages. These secondaries are adjacent the same primaries engaging the hysteresis secondaries on the active carriages. The electromagnetic waves developed by these primaries act to propel the carriages along the return sides and into the stacks before they reach those parts of the stacks being propelled at constant controlled speeds, in the carriage collection sections adjacent the entrance to the tenter frame. This use of hysteresis linear motors to propel the carriages on the return sides of the loops and into the stacks of carriages is an important feature of this invention.

Linear motors, of course, are known to the art and such motors can be used to propel carriages or tracked vehicles in an endless loop.

U.S. Pat. No. 3,893,466 to Starkey is one example of such a teaching, showing the use of a linear synchronous motor propulsion system for independently propelling tracked vehicles in a loop. The vehicles or incoming trains are selectively accelerated and then decelerated at an appropriate location to allow them to travel at a slow speed and at a selected spacing through a station.

U.S. Pat. No. 3,890,421 to Habozit is another example showing the use of a linear induction motor for controlling the speed of clamps mounted on carriages moving in endless loops for biaxially drawing plastic film. And Japanese patent application 48-38779 is still another example showing the use of a linear motor to propel tenter clips in endless loops to biaxially stretch thermoplastic synthetic resin films. There is no indication, however, as to how the carriages are controlled on the return sides of the loops.

It further is common practice, in systems involving carriages or vehicles traveling in an endless loop, to provide a loading station or startup section where the carriages are moved at low speeds for loading of passengers as in U.S. Pat. No. 3,803,466 or for other operations and are then accelerated in an operational section. In the startup section the carriages are closely spaced and frequently are clustered or grouped in a stack as shown in the above-mentioned patents, for example. After acceleration or completion of the operation, such as film stretching, the carriages are returned to the stack, or loading section, ready to start the operation again.

It is generally required that the carriages be under control at all times in their movement in and, through the loop. This is particularly true when the carriages or tracked vehicles, which are frequently moving at high speeds, are returned to the stack, otherwise damaging collisions may occur or machine operation may be affected.

Various techniques have evolved to solve this type of problem. One such solution is seen in U.S. Pat. No. 4,675,582 to Hommes and Keegan, owned by the assignee of the present invention. This patent, which is incorporated herein in its entirety by reference, discloses a linear synchronous motor control system which can be used to precisely propel synchronous secondaries attached to carriages at ever increasing speeds on the forward sides of a pair of opposed loops to stretch film, for example. This same system also can be used to decelerate the carriages under control on the return sides of such loops. In such a system where carriage speed and spacing is varying, there can never be more than one carriage in an electrically separate group of coil windings, or zone, of the primary at a time. This constraint requires many primary zones and their associated zone controls. Such a system effectively accomplishes the task of continuously propelling carriages throughout an endless loop, but at a significant cost in hardware and complexity, particularly on the return side where stacking occurs and where such precise synchronous control of the carriages may not be required.

In carriage or tracked vehicle propulsion systems the location and speed of the carriages at startup is frequently of prime importance. For example, the tracked vehicles in the Starkey patent mentioned above, appropriately travel at a selected spacing in the station, for loading purposes. This is true in other systems as well, including the system shown in the Hommes and Keegan patent just described, where control of the secondaries, in a constant velocity section, with their precise locations known prior to acceleration, is important in the operation of the system.

The instant invention, by assuring that the stacks of carriages move synchronously and abutted at controlled constant speeds in carriage collection sections, further assures that the carriages at startup will be in the proper position and that they will be moving at a proper controlled speed. In so doing, such invention provides an improved or alternate method for practicing the inventions of U.S. Pat. No. 3,803,466 and of U.S. Pat. No. 4,675,582, particularly on the return side, for example.

The location and speed of the carriages at startup is also of prime importance for drawing film in a tenter frame. For example, in stretching a web of film, it is important that the carriages to which the tenter clips are attached enter the tenter frame at a known spacing. This is true in other systems as well.

More specifically, in practicing the invention, the carriages must enter the tenter frame in synchronism with the electromagnetic wave in the first control zone. Prior to machine startup the carriages are pressed up against one another with the carriage bodies abutted and the lead carriage held stationary. This establishes the spacing at a known unvarying value at which the magnetic pole pitch of the carriage secondaries matches the electromagnetic wave pole pitch determined by the coils in the primary.

After this pre-startup orientation of carriages is established, and the remainder of the forward sides of the loops are empty of carriages, the tenter frame can be started up and the carriages will be propelled one after the other along the forward sides in synchronism with the electromagnetic waves and returned along the return sides. If the forward sides of the tenter frame are stopped in a controlled fashion, the relative positions of the carriages can be maintained and restarting does not require realigning of the carriages.

The instant invention by assuring that the stacks of carriages are moved synchronously and abutted in the carriage collection sections further assures that the carriages at startup will be in the proper position and that they will be moving at a proper controlled speed.

The tenter system of the invention also has means to alter the MD draw ratio while continuing to simultaneously biaxially draw the film. This permits threading-up film at low MD draw ratios and then gradually changing the MD simultaneous biaxial draw ratio to a higher level for continuous operation. The stack forming sections on the return sides of each loop can also gradually change the deceleration rate and stack length to accommodate the shift in numbers of carriages from the film processing sections to the stack forming sections as the MD draw ratios increase; which increase is also generally accompanied by a proportionate increase in peak carriage velocity that requires changes in deceleration rates. This unique feature to readily and rapidly change draw ratios also permits rapid, low cost optimization of film drawing ratios without having to shut down the line and fabricate and install new parts for new incrementally changed draw ratios. In commercial simultaneous biaxial film tenters, the simultaneous MD draw cannot be changed after start-up, so the simultaneous MD draw ratio at start-up and the simultaneous MD draw ratio for continuous operation have to be the same. For certain film polymers, however, there is the problem that film tearing occurs when threading-up at high draw ratios. This problem is overcome by the system of this invention. Furthermore, such invention offers precise predictable control of carriage motion with few moving parts and an open-loop (no feedback) control system, and without fixed-pitch mechanical screws and chains, or position and drive signal feedback systems. The instant simultaneous biaxial tenter frame can operate at much higher draw ratios and line speeds than previously possible.

Accordingly, this invention makes available to the art improved methods and apparatus for propelling carriages around loops in a tenter frame, and solves various problems heretofore confronting the art by providing an effective film drawing operation controlled by synchronous motors and by assuring that the carriages are moved back into stacks of carriages, in a controlled manner, using relatively inexpensive hysteresis motors. Such invention further assures that the carriages in those portions of the stacks in the carriage collection sections, are always abutted and that they too, are moving at a proper controlled constant speed, prior to entering the forward sides of the tenter frame.

Such invention represents a major advance in the art not only of linear motor systems, but of known systems for biaxially drawing plastic films in tenter frames.

SUMMARY OF THE INVENTION

Briefly described, the present invention provides an improved method and apparatus for drawing film in a tenter frame, in which synchronous and hysteresis motors are used to propel the tenter clips, under total control, throughout the opposed loops of such tenter frame.

BRIEF DESCRIPTION OF THE DRAWING

FIG. 13 is a typical enlarged cross-section of the active carriage adjacent the elongated primaries in the stack forming section seen in view 13 in FIG. 11.

FIG. 14 is a top plan view of the active and passive carriages abutted and gripping the film in the transport section.

FIG. 15 is a top plan view of the active and passive carriages separated and gripping the film at the end of the drawing section.

FIG. 21 is plan view of an inflection point in the elongated primary on the operational section of a loop.

FIG: 22 is a cross-section view of the inflection point of FIG. 21.

Figure 20:
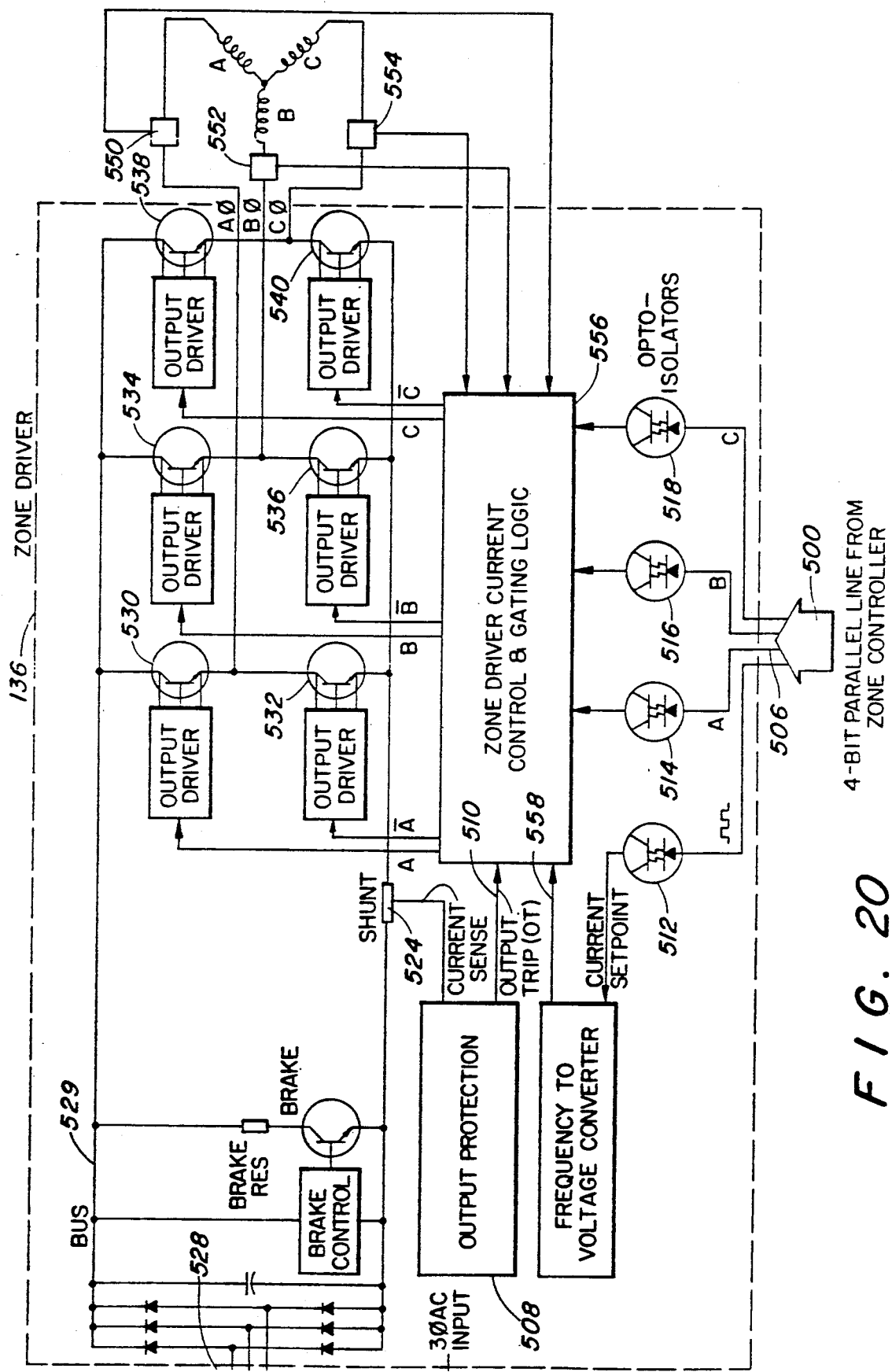
FIG. 20 is a detailed schematic of a control zone driver shown in FIG. 18 for a typical control zone in the carriage collection and operational sections of the loops and is based on FIG. 8 from U.S. Pat. No. 4,675,582.
Figure 23:
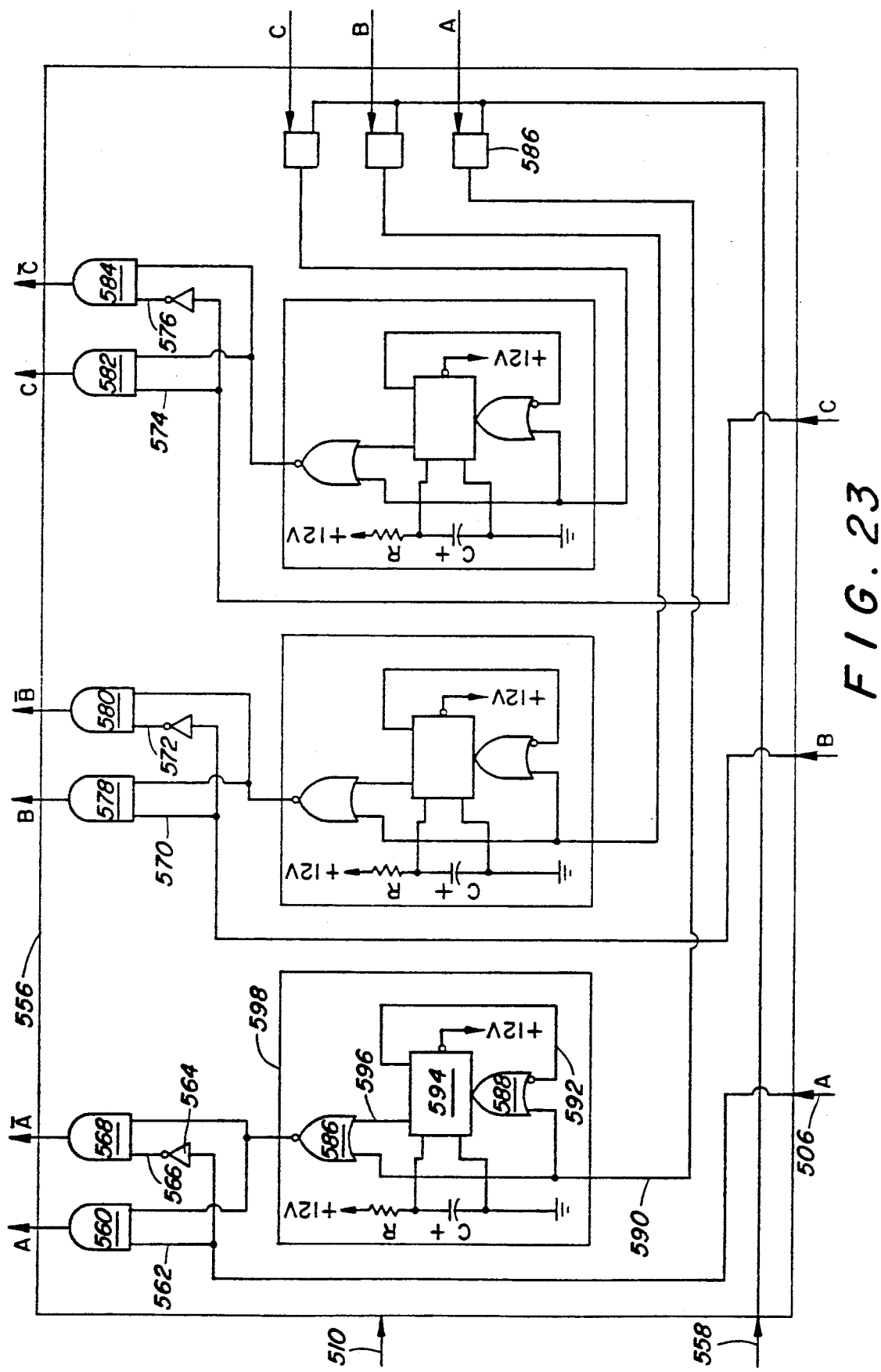

FIG. 23 is a detailed view of the control zone drive current control and gating logic shown in FIG. 20.

Figure 24:
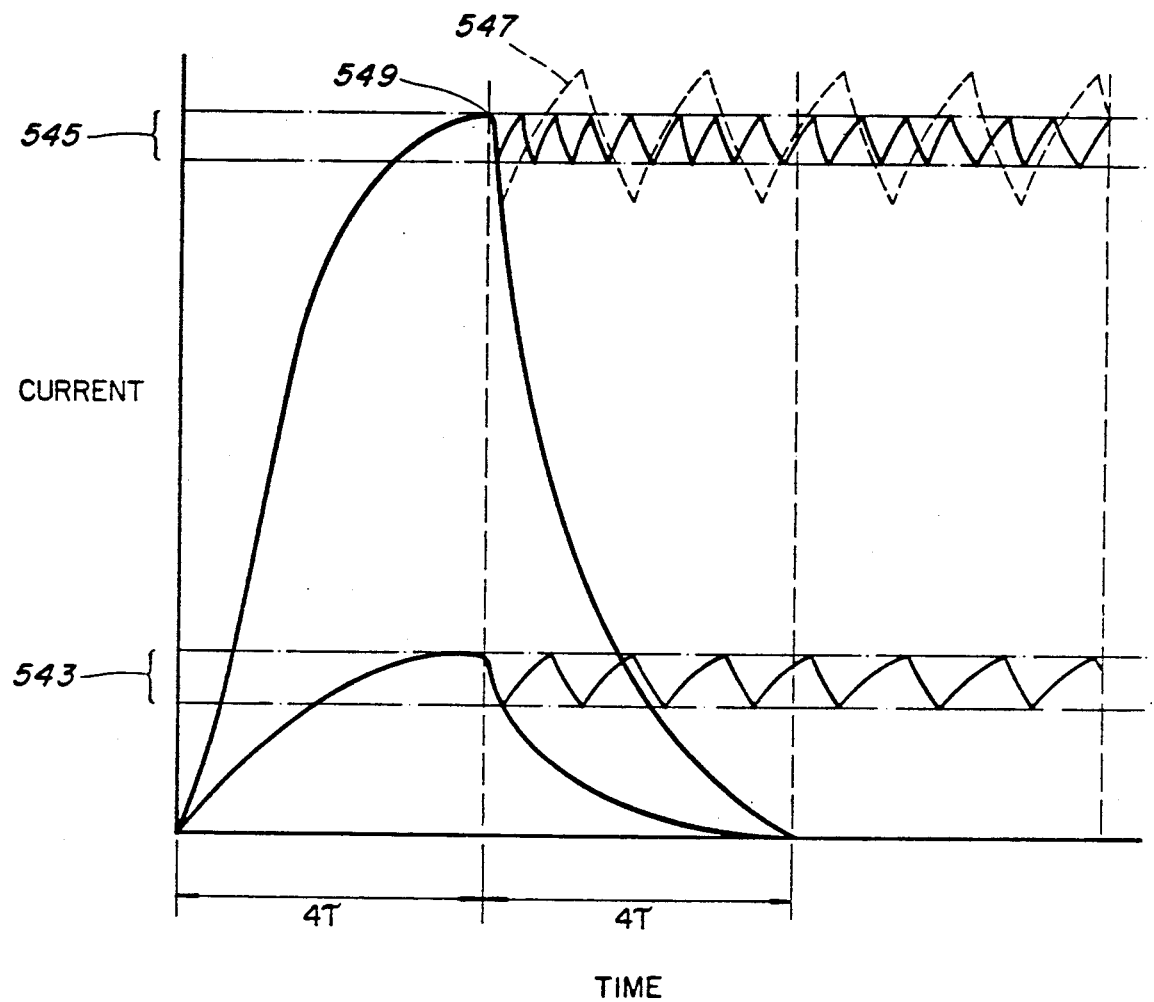

FIG. 24 is a representative plot of current versus time showing how the switching rate of the control zone driver transistors is limited by the logic of FIG. 23.

Figure 25:
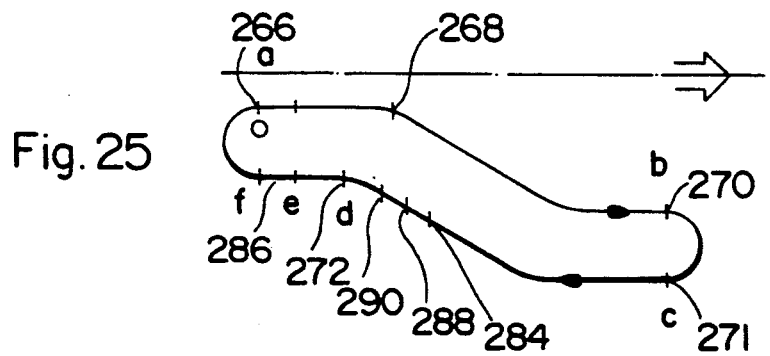
Figure 19:
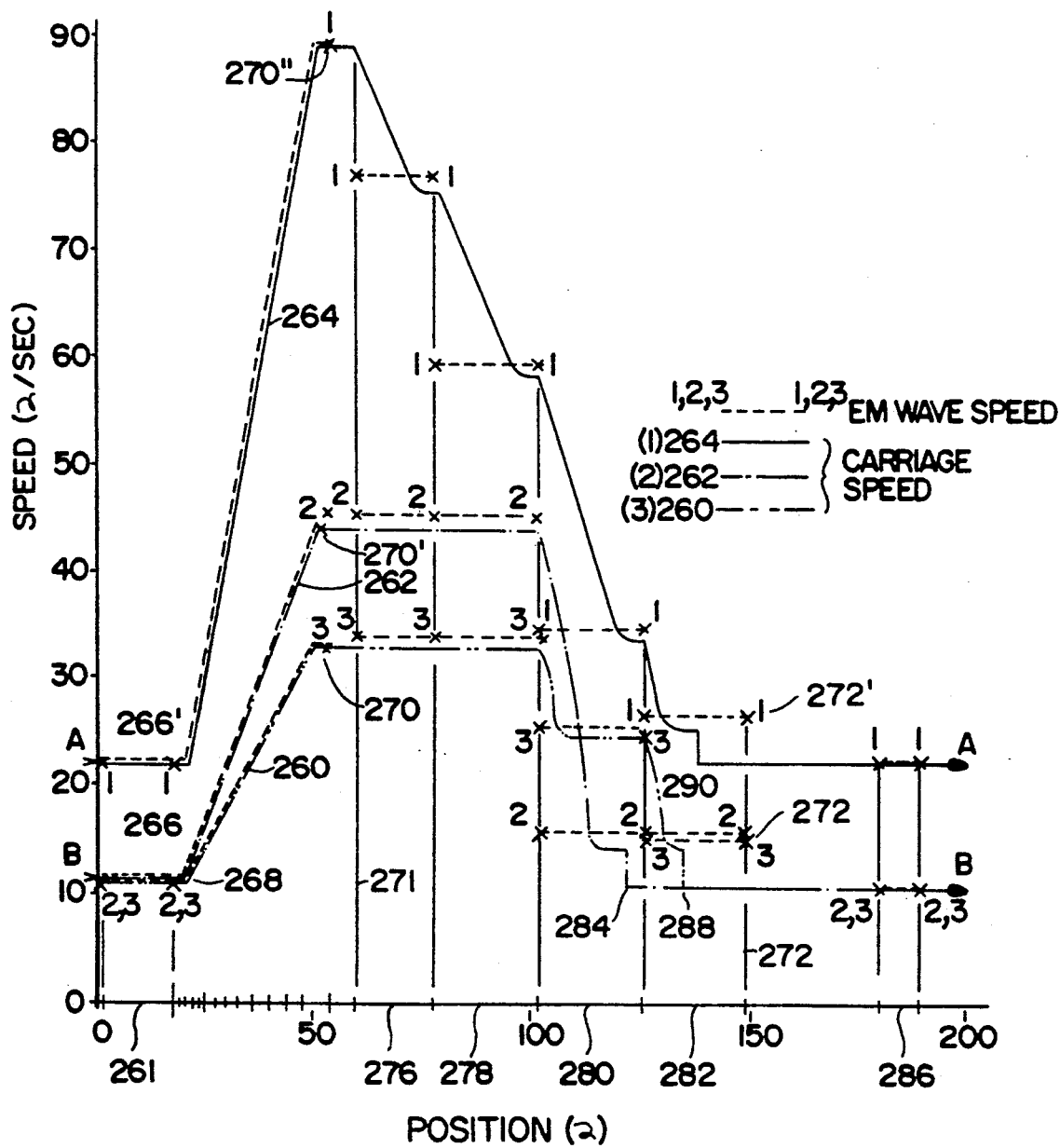
FIG. 19 is a graph of three cases of active and passive carriage (secondary) speed versus position as it travels around an endless loop of a simplified tenter.

FIG. 25 is a diagram of the simplified tenter loop for the plots of FIG. 19.

DESCRIPTION OF THE PREFERRED EMBODIMENTS

In a linear motor propulsion system for propelling carriages around an endless loop, there are various ways of accelerating and separating the carriages, but a simple reliable method and apparatus to decelerate the carriages to rejoin a moving stack, in a controlled manner, has not heretofore been available.

The system of this invention provides such a method by continuously propelling spaced apart. carriages into a stack by controlling a linear motor primary positioned adjacent the carriages to develop an electromagnetic wave that acts on a hysteresis secondary attached to each carriage. The primary is electrically divided into groups of coil windings or zones that are each independently controlled. These zones can be powered to propel the hysteresis secondary either synchronously or asynchronously from a second speed to a third speed just above the first speed of the stack. When the carriage encounters the stack, the zone at the stack entrance propels the hysteresis secondary asynchronously to press the carriages together. This fixes the location of the carriages at a known value so that subsequent accurate control of carriage movement and spacing is made possible.

The instant invention, in its preferred form, uses a combination of hysteresis and synchronous secondaries to propel the carriages around the loop and through the stack. The system provides continuously predictable control of the carriages on an operational side of the loop where carriage spacing and speed are controlled precisely and on a return side of the loop where controlled abutting of the carriages in the stack is accomplished. The linear motor controls for the operational and return sides are coordinated so that as the spacing requirements are altered on the operational side, the changes in the number of carriages on the return side can be accommodated without adding or removing carriages from the loop. The controls for the two sides also coordinate speed scale-up on the operational side and the resultant changes in braking and stacking requirements on the return side.

The movement of the carriages is carefully and constantly controlled on the operational side of the loop by the synchronous secondaries, and carriage movement into the stack is controlled by the hysteresis secondaries. This novel use of dual secondaries on each carriage plays a significant role in the operation of the preferred embodiment of the system.

Secondaries

In this application, a "synchronous secondary" is one which has a permanent magnetic pole or poles that exist in a magnetic field and remain the same regardless of the electromagnetic field of the motor primary acting on them and a "hysteresis secondary" is one which has a temporary magnetic pole or poles that exist in a magnetic field and remain the same unless the electromagnetic field, such as that of the motor primary, changes polarity so it is not aligned with the hysteresis secondary. When in a strong non-aligned field, the hysteresis secondary polarity changes to correspond (opposing polarity) to the polarity of the new electromagnetic field.

A synchronous secondary can only develop its rated force when it is moving synchronously at the same speed, i.e., no slip, as the traveling electromagnetic wave (hereinafter frequently referred to as an "EM Wave") propelling it, and when its polarity is properly aligned with the wave. When slip occurs, the synchronous secondary force and speed become erratic and the secondary may come to a stop.

A hysteresis secondary can develop at least a first force when it is operating essentially synchronously (no or very low slip) or a second force when it is operating asynchronously (substantial slip) with the traveling EM wave. In the region of very low slip, the force is between the level of no slip and substantial slip. The hysteresis secondary can be propelled essentially synchronously with the EM wave as long as an opposing force does not exceed its second force so it can travel at or near the same speed as the EM wave. It can also be propelled asynchronously traveling at a speed substantially different from the EM wave and continue to develop its second force regardless of the amount of slip. When its second force is greater than the opposing force, the hysteresis secondary speed will essentially reach that of the EM wave. When its first force is greater than the opposing force, the hysteresis secondary speed will reach that of the EM wave and its polarity will correspond (opposite poles) to that of the EM wave, and the secondary will travel synchronously with it.

To summarize, a synchronous secondary can only be propelled synchronously with an EM wave, while a hysteresis secondary can be propelled either essentially synchronously or asynchronously with such wave. In the instant invention, this latter principle enables the hysteresis secondaries attached to the carriages to constantly press such carriages together after they contact a stack and before they reach the entrance to a carriage collection section, where their movement is controlled prior to operational startup of the system of such invention.

Endless Loop

Figure 1:
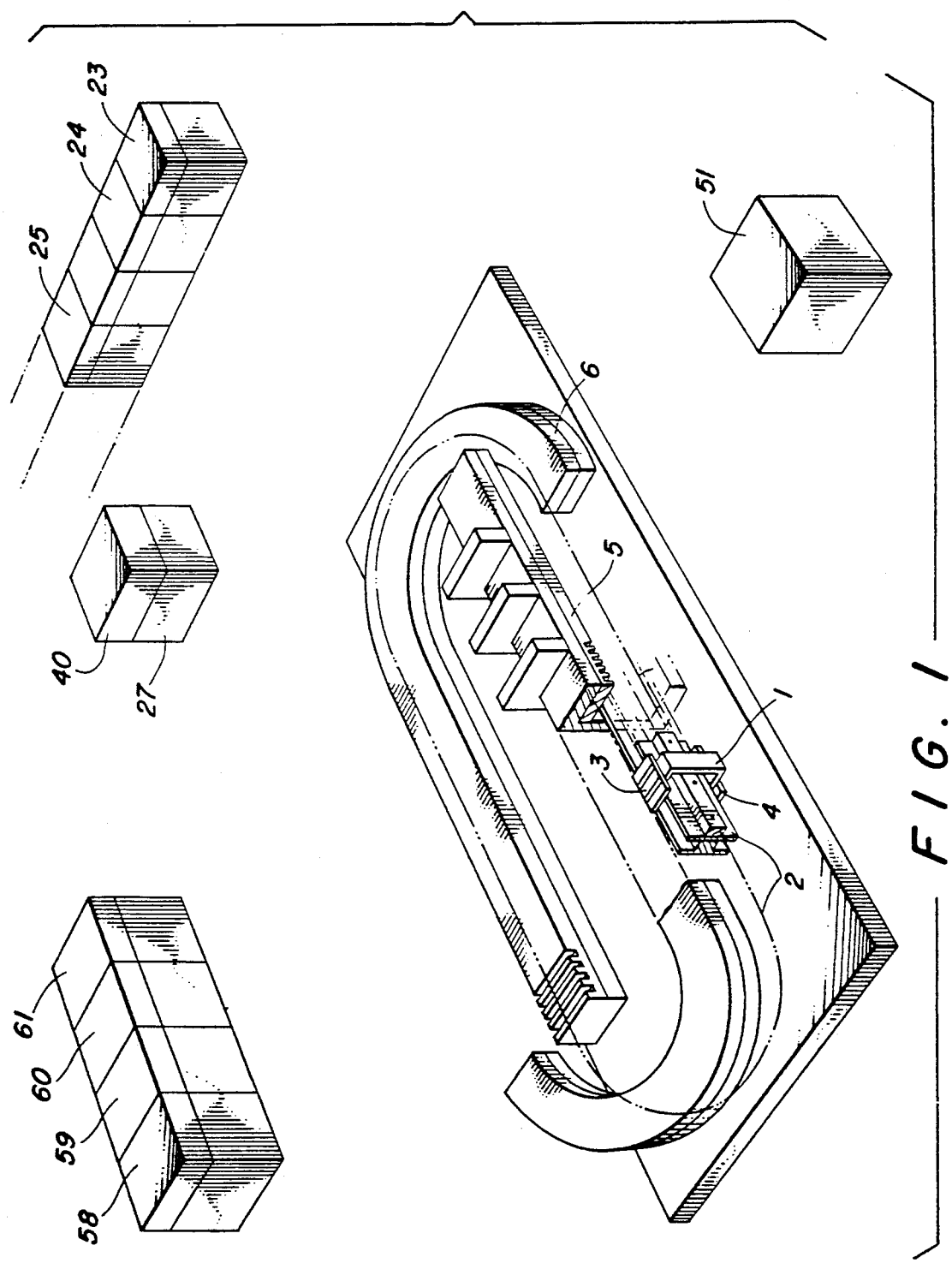
FIG. 1 is an isometric view of a linear motor propulsion system of this invention for propelling carriages or tracked vehicles around an endless loop or track.

Referring specifically to the drawing, FIG. 1 shows the endless loop traveled by the carriages, as propelled in accordance with this invention. Such carriages, 1, are supported and guided by a track 2 that defines the path the carriages take around the loop. Upper and lower secondaries 3 and 4 are attached to each carriage body. The track positions these secondaries 3 and 4 fixed distances (exaggerated for clarity) away from upper and lower linear motor primaries 5 and 6, which are positioned adjacent the track.

Figure 2:
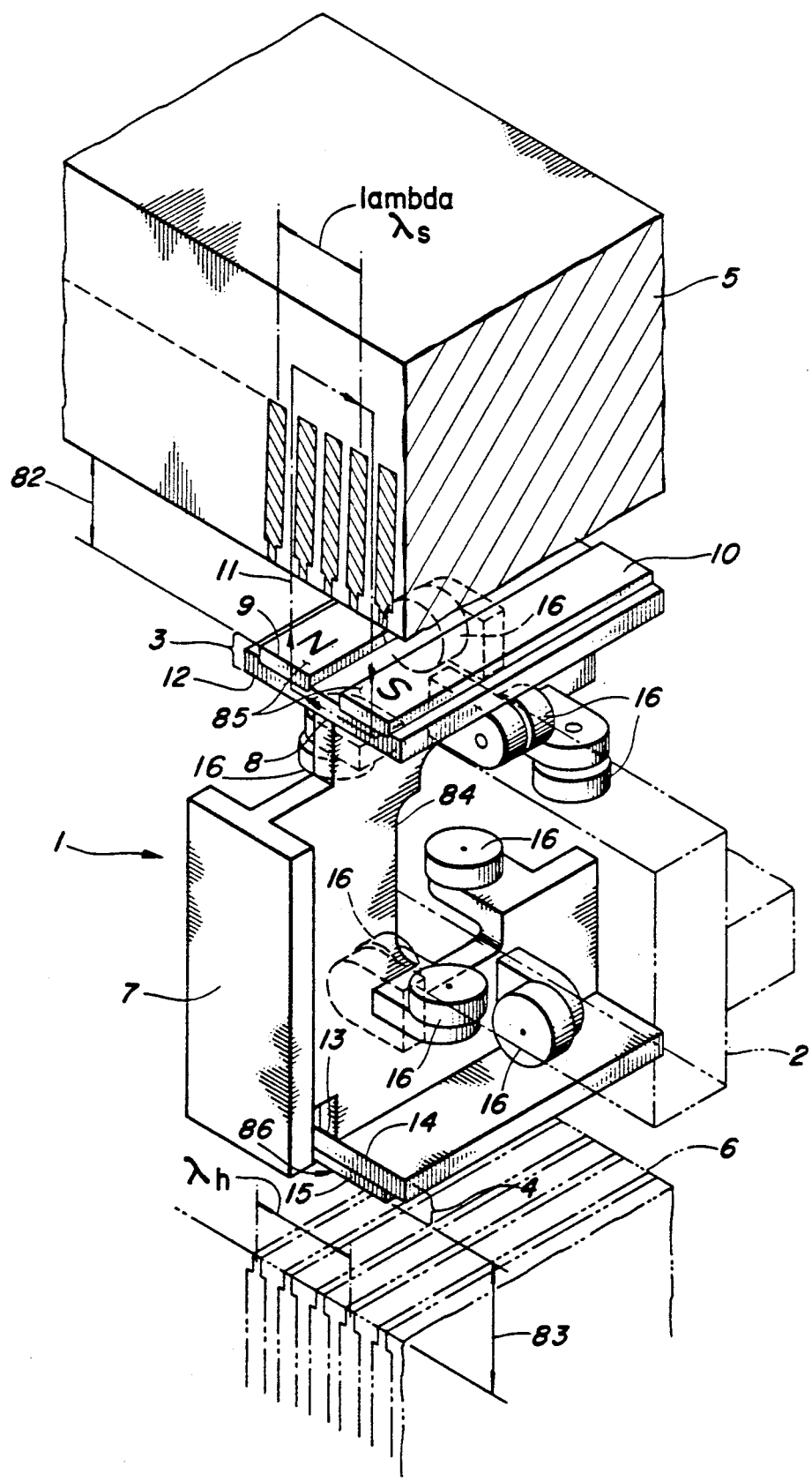
FIG. 2 is an isometric view of a dual-secondary carriage of the invention.

As best seen in FIGS. 1 and 2, each carriage 1 is generally a "C" shaped structure that largely surrounds the track 2. On the outside of the "C" shape is a first surface 7 suitable, for example, for mounting an article that is to be moved by the carriage.

In a preferred embodiment, a synchronous linear motor secondary 3 is attached to a second surface 8 at the top of the "C" shaped carriage 1. Such secondary includes two permanent magnets 9 and 10 with alternate poles facing outwardly to complete a magnetic flux path, shown at 11, which includes the upper primary 5. The magnets which are affixed to a high magnetic permeability back iron material 12 such as steel or cast iron, are spaced with their poles apart at a distance, lambda s, equal to the pole pitch of the upper primary 5 and they form a third surface 85 which is compatible with the shape of the opposing surface of the primary 5. The magnet material may be conventional permanent magnet material such as tungsten or chrome magnet steel, or permanent rare-earth magnets such as aluminum-nickel-cobalt alloys (alnico), cobalt magnet steel, or preferably samarium cobalt.

Further, in this embodiment, a hysteresis linear motor secondary 4 is attached to a fourth surface 13 at the bottom of the "C" shaped carriage 1. This secondary consists of hysteresis material 15, which forms poles on its lower face when in the electromagnetic field produced by the lower primary 6. The secondary may also preferably include a high magnetic permeability back iron 14. In some cases, however, it may be more convenient to mount the hysteresis material on a surface having a low permeability such as aluminum, or a nonmetal surface, or to mount the hysteresis material along its edges with no backing surface. It may also sometimes be desirable to mount the hysteresis material on a grooved, high permeability surface. Such variations are often used in rotary hysteresis motors. The lower face of the hysteresis material forms a fifth surface 86 which is compatible with the shape of the opposing surface of the lower primary. The carriage body 84 may be made of a high magnetic permeability iron or steel that conveniently also forms the back irons 12 and 14. The geometry (thickness, shape, area) of the hysteresis material is a factor determining the force developed in the EM field. The hysteresis material is one having a high magnetic hysteresis and may be unmagnetized magnet material as listed above, and is preferably unmagnetized alnico. A flux path similar to that shown at 11 is formed with the lower primary 6 and the hysteresis secondary 4. The novel carriage 1 with its dual secondaries 3 and 4 is significant in the preferred operation of this invention.

The pole pitch of lower primary 6, lambda h, does not have to match the pole pitch lambda s of upper primary 5 and, since the hysteresis material does not have fixed poles, the pole pitch of the lower primary can be any convenient pitch. In a preferred embodiment, however, the pole pitch of the upper and lower primaries is the same, i.e., lambda s=lambda h=lambda.

A system of eight rollers 16, on each carriage ride on four elongated surfaces of the rectangular track 2 to maintain the orientation of the carriage, as shown, and provide anti-friction travel of the carriage along the track. The outer surfaces of the magnets 9 and 10 and the hysteresis material 15 are closely spaced by constant distance clearance gaps 82 and 83 (exaggerated for clarity) with the adjacent surfaces of the primaries 5 and 6, as shown in FIGS. 1 and 2. The surfaces of the primaries and the magnets and hysteresis material can be planar, as shown, or for certain applications the primaries may have an elongated concave or convex surface with the magnets and hysteresis material shaped to be compatible. For instance, the magnets could define a convex surface, elongated in the direction of travel, which is closely spaced from an elongated concave primary surface. If the hysteresis secondaries are always traveling along a radius when adjacent the lower primary, the outer surfaces could also be a toroidal surface. In general, the outer surfaces of the secondaries and the compatible surface of the primaries are shaped to maintain a constant clearance gap between the moving secondaries surface and the closely spaced surface of the primaries.

As best seen in FIGS. 1, 4, 5 and 6, the upper or first primary 5 is located adjacent the track 2, in part of the loop, as shown at 17, in position to act on the upper synchronous secondary 3 on each carriage. The lower or second primary 6 is located in another part of the loop, as shown at 18, adjacent the track 2, to thereby act on the lower hysteresis secondary 4 on each carriage. These primaries propel the dual secondaries, and the carriage to which they are attached, in an endless loop, through the three prime functional sections of the system; a carriage collection section 41, an operational section 42 and a stack forming section 43. The operations in these sections will be described later in greater detail.

Figure 6:
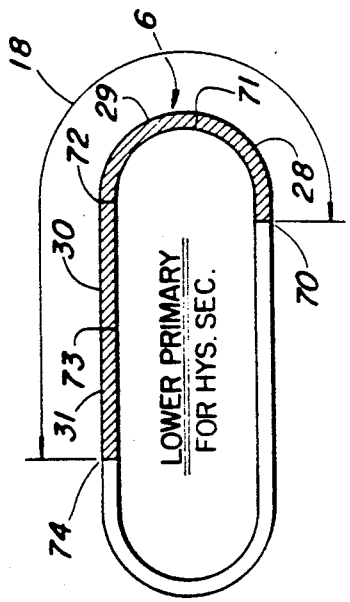
FIG. 6 is a plan view of a lower second primary for propelling the carriages around the rest of the loop.
Figure 4:
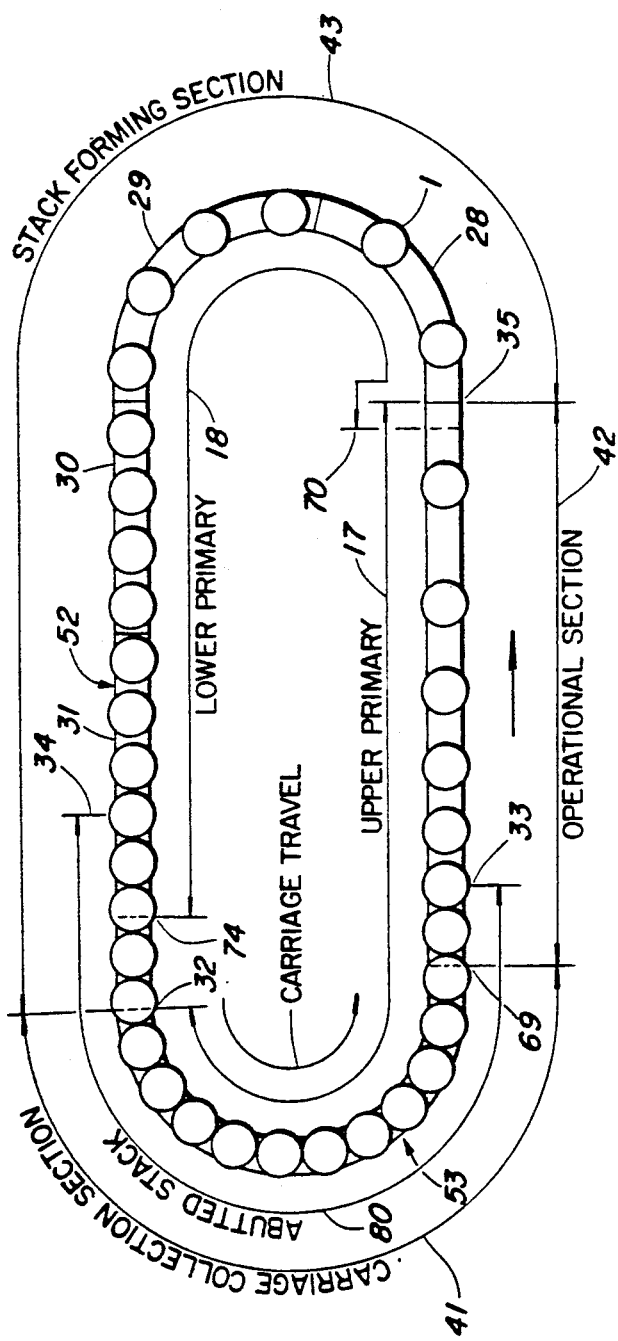
FIG. 4 is an exemplary plan view of the system at a given instant in time showing the carriages distributed around the endless loop.
Figure 5:
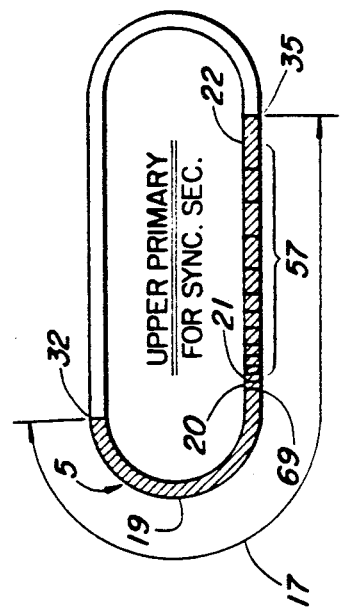
FIG. 5 is a plan view of an upper first primary for propelling the carriages around a part of the loop.

FIG. 4 is a plan view of a "snapshot" of the carriages 1, indicated by circles, traveling around the endless loop. The carriages are shown superimposed on the upper and lower primaries 5 and 6. FIGS. 5 and 6 are plan views of such primaries (shown shaded) showing their relative positions, 17 and 18, in the loop.

Upper Primary

The upper linear motor primary 5 is divided into a plurality of zones, such as first zone 19 and second zones 20, 21, etc., 22, as shown in FIG. 5, to permit synchronous control of the synchronous secondaries 3 in their movement in the carriage collection and operational sections 41 and 42 of the loop. A suitable system for controlling such secondaries is shown in U.S. Pat. No. 4,675,582 to Hommes and Keegan, mentioned previously.

In this patent, a synchronous linear motor primary is electrically divided into groups of coil windings or zones with each zone being independently powered and controlled. Each zone is powered by a zone driver having switches to switch a DC voltage to provide a synthesized three phase AC power waveform to the coils in each zone. Each zone driver has a zone controller with a steady state memory and memory access means to provide switching instructions to the zone driver for a given operating condition. The memories in each zone controller contain the same number of predetermined binary switching instructions to define a switching waveform that can slope in frequency between two limits. The steady state switching instructions are simultaneously output from all zone controllers and are paced by a common time base to start, step through, end, and restart the accessing of each memory in each zone controller in unison. In an acceleration portion 57 of the operational section 42 of the system of the instant invention, this causes varying speed, repeating EM waves to be developed along the primary that are coordinated in time to independently proper one synchronous secondary after another through the acceleration portion. A plot of frequency vs. time of such a wave would have a sawtooth shape. In this portion there is never more than one secondary in a zone at a time. When it is desired to change operating conditions, a transition memory in each zone controller is accessed that has instructions to propel several secondaries, each uniquely as required. At the end of the transition, a different steady state memory is accessed repeatedly to propel each secondary the same for as long as it is desired to remain at the new operating condition. A central controller coordinates the simultaneous transfer from one control memory to another in all zones. A system computer coordinates overall system operation.

The carriage collection and operational sections 41 and 42 of the instant system are closely coordinated and carriage movement in such sections is under the control of the upper first primary 5, in this part of the loop. In these sections each zone of the primary, including first zone 19, and second zones 20 through 22, has its own independent driver and controls, such as 23, 24, etc. and 25, that are electrically connected respectively to such zones and are coordinated by a central controller 27, which includes a time base 40, and a computer 51 to define a linear synchronous motor control system. This system provides synchronous control of a plurality of carriages in part of an abutted stack of carriages in the carriage collection section 41 as powered by zone 19, as controlled by driver and control 23. This system also provides independent synchronous control of each carriage 1 as it accelerates and separates from adjacent carriages along the operational section 42 of the loop. Although there are plurality of zones shown in the acceleration portion 57 of the operational section, in a simplest case, where the synchronous secondaries on adjacent carriages are widely separated when the carriages are abutted, the acceleration portion 57 may consist of only a single zone several lambda long. With this initial wide spacing, the secondaries can be independently accelerated and never have more than one secondary in one acceleration zone at a time.

Lower Primary

While the synchronous linear motor system just described is highly effective for accelerating carriages, and further may be used to return the carriages to a stack, this invention offers an improved system, particularly for stacking the carriages on the return side of the loop. This stacking operation is under the control of the lower linear motor primary 6.

Such linear motor primary is also divided into a plurality of zones, e.g., third zones 28, 29, 30 and 31, as shown in FIG. 6, to permit a controlled, stepped deceleration of the carriages as they pass through the stack forming section 43, of the loop, and cause controlled impact and pressing abutment of the carriages before they meet the accumulated stack of carriages in the carriage collection section 41. In each lower primary zone the speed of the EM wave is constant, not varying, and since a synchronous relationship with the hysteresis secondary on the carriage does not always exist, there is no critical phase relationship between zones that requires precise waveform coordination between such zones. For these reasons, conventional motor drives and controls can be used for each zone of lower primary 6, such driver/controls 58, 59, 60, 61 that are electrically connected respectively to the third zones 28, 29, 30 and 31 of the primary. Conventional inverter type drives are preferably used in this part of the system. Their frequency is controlled by the computer 51, based on system requirements.

The carriage collection section 41 has an entrance and an exit, as shown in FIG. 4. It is critical, in the operation of the system of this invention, that the carriages 1, under the control of the hysteresis secondaries 4, be propelled into the moving stack of carriages prior to reaching the entrance to the collection section. Specifically, such carriages are propelled by zone 31 of the lower primary 6 in this portion of the stack forming section 43, which zone acts on each hysteresis secondary 4 to propel the carriage into the stack and to continue that pressure so to push the carriages together, prior to reaching the entrance of the collection section 41.

Carriage Stack

It is important, during system operation, that there is a stack of moving carriages 80 in the loop, such as the one shown in FIG. 4. Such stack has an entrance at about 34 and an exit at about 33. By "moving queue" or "moving stack" of carriages is meant a region of abutted carriages that has the exit end of the region "fixed" in position in the loop, and has moving carriages continuously entering the entrance end, moving through the stack, and leaving the exit end. At this exit end of the stack, the carriages should be propelled "synchronously" at a precisely known speed and position determined by some means engaging the carriage such as a sprocket, screw thread, or synchronously acting linear motor. This ensures that when it is desired to separate the carriages, their exact position and speed are already precisley known without the need for sensors or other feedback. The stack 80 itself does not travel around the loop but one end of the stack may move as the quantity of carriages in the stack change. The carriages within the stack are all traveling at the same speed as they move through the stack. Within the stack, the spacing between carriages is constant and the carriages are preferably abutted. The position in the loop of the entrance and exit ends of the stack, as distinguished from the entrance and exit of the carriage collection section 41, varies by at least the width of a carriage as a carriage instantaneously abuts or separates from the stack and thereby redefines the position of the stack ends.

The abutted stack of carriages 80 must always comlpletely fill the carriage collection section 41, in which synchronous propelling of part of the stack is required. As shown in FIG. 4, the carriage collection section is defined by the first synchronous zone 19 that engages a plurality of synchronous secondaries 3 on the carriages that are abutted to progressively develop a propelling force that exceeds any other forces on the carriages in the stack. Such other forces may be a stack pressing force (developed in the stack forming section to be explained later), plus frictional forces on the carriages and external forces placed on the carriages in the stack, such as film tension, for example, where the instant system is used in a film tenter operation. If all of these forces on the carriages in the stack are low, the carriage collection section could be shorter than shown, for instance it may only extend from position 69 and 33 in FIG. 4, where the carriages are shown synchronously propelled in the stack by zones 20 and 21 in the operational section. It is preferred, however, to provide a separate zone, zone 19, to provide synchronous propelling of part of the stack. The secondaries 3 on the carriages must always enter zone 19 at a fixed spacing and in synchronism with the EM wave developed there.

Abutting of the carriages is the best way to precisely fix secondary to secondary spacing in the stack forming section of the loop, where the hysteresis secondaries 4 can slip varying amounts on the EM wave, but within predictable limits. The trailing carriage in the stack must always be located before the end of lower primary 6 since the force developed on the hysteresis secondaries determines the total pressing force keeping the carriages abutted before entering the carriage collection section 41. The end of the lower primary is fixed in the loop by end 74 of zone 31. The stack entrance, at 34, must also be located after a position, at about 52, where the carriages have decelerated to an "overspeed" slightly greater than the stack speed. This position is not fixed in the loop but varies with a given operating condition, as will be best understood during the discussion of FIGS. 8 and 9. The overspeed is predetermined by the preset EM wave speed in hysteresis zone 31 at the end of the stack forming section. This velocity may be from about 5–100 feet per minute higher than the stack speed determined by the EM wave in synchronous zone 19. The impact speed is defined by the difference between the overspeed and the stack speed and must be kept low to avoid damage to the carriages entering the stack. The overspeed, determined by the EM wave engaging a hysteresis secondary, acts to propel the carriages into controlled abutment with the entrance end of the stack and propels the carriage into pressure abutment within the stack.

The minimum deceleration distance of each carriage is determined by the initial carriage speed, the total weight of the carriage, frictional loads on the carriage, and the force developed by the EM wave on the hysteresis secondary (a function of coil current, magnetic air gap, slip, and secondary geometry). These factors must be taken into consideration in determining the maximum allowable entrance end-of-stack position on the stack forming side of the loop. In most situations there is an effort to keep all of these factors constant, but mechanical tolerances cause slight variations from carriage to carriage. The random nature of these variations, however, will average to a "constant" value over many carriages.

The entrance end of the abutted stack of carriages occurs before the carriages leave the stack forming section and enter the carriage collection section at 32. The speed of the stack, however, is set by the speed of the EM wave, in zone 19, acting on the synchronous secondaries 3, where no slip occurs, and the stack is being propelled at a constant known speed. The pole pitch of the EM wave in zone 19 equals the pole pitch of the stacked carriages so all the carriages in this zone can be propelled simultaneously by a common EM wave. From the end of the stack to the end of the lower primary zone 31, from 34 and 74, however, the EM wave in zone 31 in the stack forming section is developing a force on the hysteresis secondary 4 on each carriage to press the carriages into an abutted condition. This hysteresis secondary stack force must always be less than the total pull-out force of the synchronous secondaries in the stack, so synchronous propelling of the stack is maintained. For different operating conditions where the stack length increases and more hysteresis secondaries are being propelled in the stack, the force developed by each of the hysteresis secondaries may have to be decreased to maintain the total hysteresis stack force below the total synchronous pull-out stack force. It is also desirable to keep the total hysteresis stack force low to avoid unduly high contact forces between the carriages.

System Summary

In summary, then, this invention, briefly described, includes a system for propelling carriages from a stack in a carriage collection section 41 to a spaced-apart condition and back to the collection section by propelling the carriages along an endless track 2, using a linear motor. Such system, in a preferred embodiment 1 includes a first primary 5 positioned along a first part of the track and a second primary 6 positioned along a second part of the track. The carriages, which are guided around the track, each has a synchronous secondary 3 positioned adjacent the first primary 5 and a hysteresis secondary 4 positioned adjacent the second primary 6; control means are provided for each primary whereby the first primary 5 propels the carriages through the collection section 41 and accelerates them from an abutted to a spaced-apart condition, and whereby the second primary 6 decelerates the carriages, propels them into an abutted condition in a moving stack and applies pressure to the abutted carriages before the collection section entrance.

The entrance to the carriage collection section 41 is located at the beginning of the first primary 5. The trailing carriage in the moving stack of abutted carriages is always located before the end of the second primary 6.

Further, in this embodiment, the first primary 5, is provided with coils electrically grouped into zones, including a first zone 19 and a plurality of second zones 20–22. The second primary 6 also has its coils electrically grouped into a plurality of third zones 28–31.

The system's basic operational units include a carriage collection section 41, an operational section 42 and a stack forming section 43. The carriage collection section has an entrance and an exit and one end 32 of the first zone 19 of the first primary 5 is located adjacent the entrance to the carriage collection section 41 and the other end 69 is preferably located adjacent the exit of such carriage collection section. Further, in this embodiment, one end of the first of the plurality of second zones 20–22 of the first primary 5 is located adjacent the start of the operational section 42 and the other end of the last of the plurality of second zones of the first primary 5 is located adjacent the finish of the operational section. The plurality of third zones 28–31 of the second primary 6 are located adjacent the stack forming section. The system has means to independently develop electromagnetic waves in each of the zones for controlling the propelling of the carriages 1 through all the sections.

The system just described is adapted to propel carriages around a loop and into and through a stack by a novel method or methods of operation. In so doing such carriages are propelled, in the preferred embodiment, by a linear motor having hysteresis and synchronous secondaries 3 and 4 attached to the carriages 1 that are traveling continuously in an endless loop defined by a guide track and are propelled by discrete zones of linear motor primaries positioned adjacent the track. Such method includes the steps of:

propelling the carriages along the first zone 19 of the first primary 5 by acting on the synchronous secondaries 3 to propel the carriages in an abutting relationship in a stack, in a carriage collection section 41, at a first constant speed;

propelling the carriages along the second zone or zones 20–22 of the first primary 5 by acting on the synchronous secondaries 3, one by one, to accelerate the carriages, in an operational section 42, from the first speed abutted to a second speed spaced apart;

propelling the carriages along at least a third zone 31 of the second primary 6 by acting on the hysteresis secondaries 4 to decelerate the carriages, in a stack forming section 43, from the second speed spaced apart to a third speed close together, the third speed being greater than the first speed;

essentially synchronously propelling the carriages along one part of the third zone 31 at the third speed prior to contact with the abutted carriages in the stack forming section 43; and asynchronously propelling the carriages along another part of the third zone 31 to produce and abutting force which presses the carriages into the abutted carriages which are moving at the first speed in the stack forming section 43.

This invention also includes a method of controlling the propulsion of a plurality of spaced apart carriages into a stack of moving abutted carriages including the steps of propelling the abutted stack of carriages at a first speed and propelling a spaced apart carriage into a controlled impacting abutment with the stack of abutted carriages by propelling the spaced apart carriages at a third speed greater than the first speed before the carriage reaches the trailing carriage in the stack, using a linear motor.

This invention also includes a method of controlling the propulsion of a plurality of spaced apart carriages into a stack of moving abutted carriages, using a linear motor, including the steps of propelling a spaced apart carriage essentially synchronously with respect to an electromagnetic wave at a third speed, in a stack forming section 43, prior to reaching the trailing carriage in the stack which is traveling at a first speed less than the third speed, and propelling the carriages asynchronously with respect to the same electromagnetic wave, in the stack forming section 43, after the carriages reach the stack. In this method, the linear motor comprises a primary and at least a hysteresis secondary attached to each of the carriages and the abutted carriages in the stack move synchronously at the first speed with respect to another electromagnetic wave.

The invention also includes a method of propelling carriages asynchronously with respect to an electromagnetic wave in one part of a stack and synchronously with respect to another electromagnetic wave in the other part of the stack. The carriages are propelled asynchronously with respect to the EM wave developed by zone 31 of the lower primary 5 and synchronously with respect to the EM wave developed by zone 19 of the upper primary 5.

The third zone 31 of the lower primary acts on the hysteresis secondaries 4 to propel the carriages into the stack, prior to their entrance into the carriage collection section 41. In so doing, such secondaries and associated primary together function as a hysteresis linear motor in this significant part of the overall system.

Hysteresis Linear Motor

Figure 7:
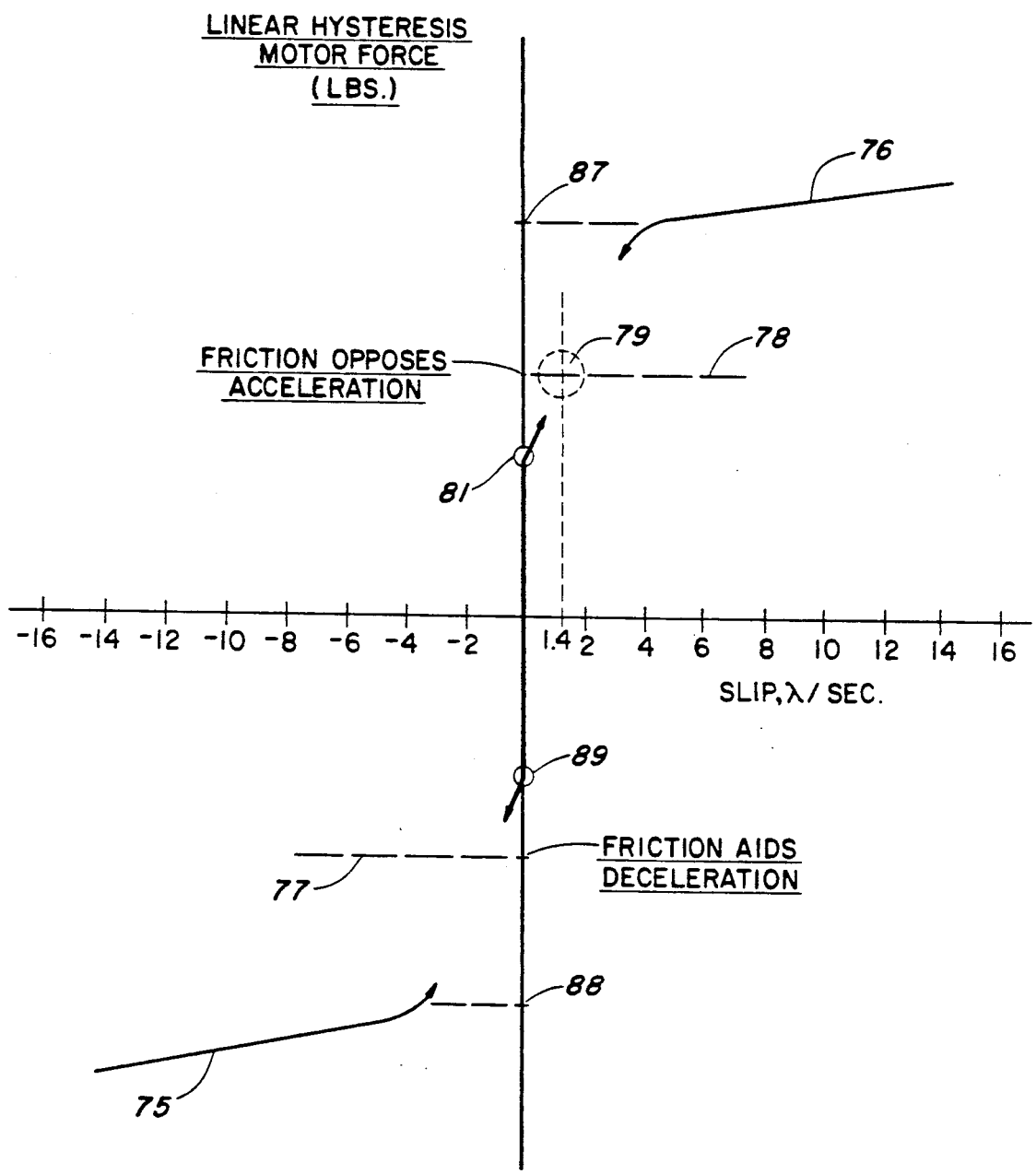
FIG. 7 is a graph of force versus slip for a linear hysteresis motor.

In greater detail, a hysteresis linear motor develops approximately constant force over a large differential speed, i.e., slip, between the secondary speed and the EM wave speed. As with any motor, the EM wave speed is determined by the fixed pole pitch (lambda) of the primary windings, and the frequency of the alternating current in the coils (EM speed = 2 lambda f). The force level developed by the hysteresis motor configuration is determined by the level of current in the coils in the primary that develops the EM wave acting on the hysteresis secondaries. A representative graph of the linear hysteresis motor force versus slip is shown in FIG. 7 for a given coil current. The force level and slope of the curve will vary with current and also changes slightly with slip along the curve at 75 and 76, for example.

As can be seen in FIG. 7, the hysteresis force does not remain at its second force level 87 and 88 at zero slip, but rather it tapers off within about ±3 lambda/sec slip. The exact nature of the curve in this region is uncertain and is therefore not depicted in the figure. At zero slip, or synchronous speed, the motor behaves similar to a permanent magnet synchronous motor and the developed force is just enough to counteract the loads on the motor. In this example, the presence of a friction force acting on the carriage is shown superimposed at 77 and 78 for comparison. On the left of the plot, the hysteresis motor and friction act in the same direction, therefore, they work together to slow the carriage and reduce slip. On the right hand side of the plot, they act in opposite directions; if the friction force is greater than the first motor force 81 at zero slip (as illustrated at 78), the friction force will continue slowing the carriage until the carriage is going slower than the EM wave and positive slip exists. The system is now operating on the right side of the plot. As the carriage continues slowing, slip increases and the hysteresis motor force increases until it equals the friction force as at 79. A force balance then occurs and the slip stabilizes; friction forces now no longer decrease carriage speed. The carriage speed is now stabilized or essentially locked onto the EM wave speed at a low slip of about 1.4 lambda/sec as shown. This essentially locked-on condition does not necessarily occur when the EM wave speed and the carriage speed are exactly matched, but it does repeated occur at a predictable low slip. If the friction force is lower than the first motor force at 81, the carriage speed will exactly match the EM wave speed. At this stabilized, essentially locked-on condition and especially when the carriage is traveling synchronously at exactly the EM wave speed, the effect of random variables between carriages is essentially eliminated and all carriages travel at essentially the same speed. This obviously is a desirable condition that prevents carriage collisions.

To summarize the modes of operation possible with a hysteresis secondary linear motor, it can operate as follows:

"exactly synchronously" or "synchronously"—this is possible when externally applied forces are less than the first levels at about 81 and 89 in FIG. 7 and slip is zero;

"essentially synchronously"—possible when externally applied forces are less than the second levels at about 87 and 88 in FIG. 7 and slip is predictably a low value and changes only slightly with load; and "asynchronously"—possible when externally applied forces are greater than the second levels at about 87 and 88 in FIG. 7 and slip may change considerably with load.

System Operation

When decelerating the carriages, the linear hysteresis motor generates an opposing essentially constant force over a certain distance, thereby removing kinetic energy from the carriage. The carriage energy is determined by its mass and velocity. Removing energy, therefore, decreases its velocity. The rate of deceleration can be varied by one of two methods. A first method is to vary the current to the primary, thereby varying the force developed on the hysteresis secondary and the carriage. A second method is to keep the current, and therefore the force, constant and vary the distance over which the force acts. This second method is accomplished by varying the distance over which slip occurs before the hysteresis secondary essentially locks onto the EM wave. Friction on the moving carriage also acts to decelerate it, but this is usually a force that is difficult to control and it may vary from carriage to carriage. It is desirable, therefore, to minimize the effects of slight variations in frictional force by operating the hysteresis motor at relatively high force levels so frictional variations have a small relative effect on the total deceleration force acting on the carriage. For this reason, the second method of varying the deceleration is preferred, since the motor force can remain at a nearly constant high level. This method will now be described in greater detail, referring specifically to FIG. 3.

Figure 3:
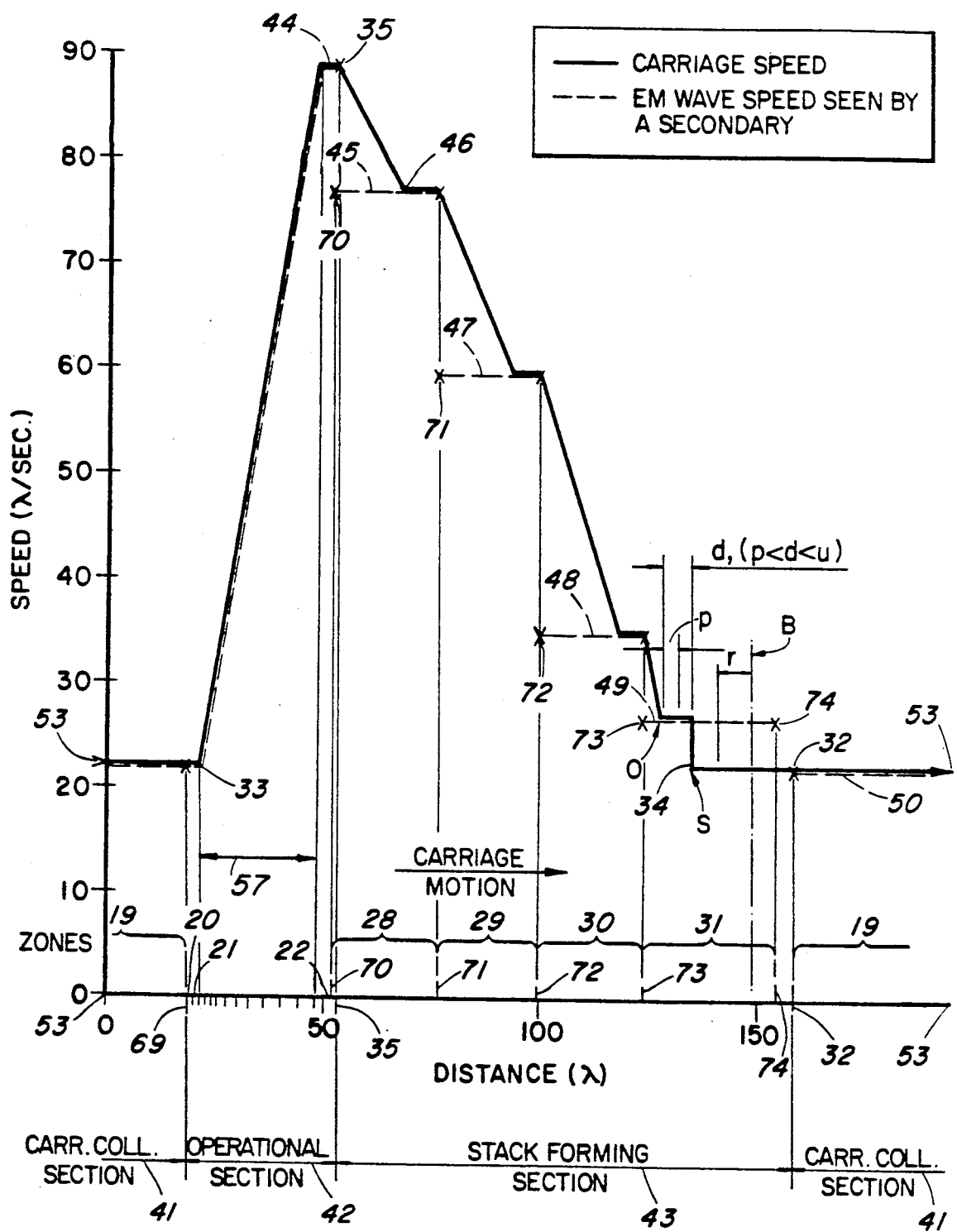
FIG. 3 is a graph of one case of secondary (carriage) velocity versus position as it travels around the endless loop.

A typical operation of the system of this invention is best seen by referring to FIGS. 3, 4, 5 and 6. To simplify the discussion, it is assumed that the maximum achievable motor force at zero slip is higher than the friction force so the carriage speed equals the EM wave speed and the carriage will travel exactly synchronously. In FIG. 3, the solid line plot of speed versus position represents the carriage speed and the dashed line plot represents the EM wave speed seen by a secondary, shown slightly offset for clarity. The origin and end positions on the plots join to define the loop and roughly correspond to position 53 in FIG. 4. The carriages are propelled from a continuous abutted stack extending from the position 33 in the operational section 42 of the loop to a spaced apart condition, at 35, and then are moved together along the stack forming section 43 of the loop and enter the stack at about 34. The carriages then move through the carriage collection section 41 in an abutted condition with their speed controlled by the EM wave developed in zone 19 acting on the upper synchronous secondary 3 of each carriage. The carriages are individually accelerated in the acceleration portion 57 by the independently controlled upper primary zones 20-22 of the upper primary 5, which develops EM waves that act to individually accelerate the upper synchronous secondaries 3. In the operational section extending from 69 to 35 there are thirteen independently controlled zones, in the embodiment shown.

In the example shown in FIG. 4, there are thirty-six carriages in the endless loop. The carriages enter the acceleration portion 57 of the operational section 43 abutted and spaced one carriage length between centers, traveling at a first speed of 22.2 lambda/sec. At the end of the acceleration portion they are shown spaced 4 carriage lengths apart and reach a final second speed of 88.8 lambda/sec before leaving the operational section 42. The carriages have undergone a speed and spacing change of 4 x. The frequency of the AC power developing the EM wave is changing in a repeating sawtooth pattern in each zone to cause this acceleration. The secondaries are not in a zone, however, during that zone's reset portion of the sawtooth pattern. They only see a continuously increasing EM wave, as depicted by the sloping part of the dashed plot in FIG. 3. In the zones within operational section 42 there is never more than one carriage in a zone at a time.

Near the end of the operational section 42, the lower primary begins at 70 and develops an EM wave that acts on the lower hysteresis secondary 4 on each carriage. The last upper primary EM wave, developed in zone 22, at its maximum speed is traveling at 88.8 lambda/sec, as shown at 44 in FIG. 3, and is propelling the synchronous secondaries 3 at this speed as each carriage approaches the end of such zone. The first lower primary EM wave, from zone 28, is set to travel at a speed of about 76.9 lambda/sec, at 45, determined by the constant frequency of the AC power developing the wave in the primary. The hysteresis secondary on the carriage will initially slip on this wave and start decelerating as it enters the stack forming section, at 35. The carriage will continue decelerating until it reaches the EM wave speed of zone 28, at about 46. There may be several carriages in a single deceleration zone, such as zone 28, at a time. Upon reaching the EM wave speed, the hysteresis secondary 4 will stop slipping and act like a synchronous secondary and will cause the carriage to travel synchronously at the wave speed of 76.9 lambda/sec.

The EM wave in the next lower primary zone is set to travel at a speed of 59.4 lambda/sec, at dashed line 47, which will act to further decelerate the hysteresis secondary 4 attached to each carriage from 76.9 lambda/sec to 59.4 lambda/sec. The next lower primary zone 30 further slows the carriage to 33.9 lambda/sec, at 48, and the following zone 31 brings the carriage down to the overspeed velocity, or third speed, of 26.7 lambda/sec, at 49.

The carriage encounters the stack, which is traveling at the first speed of 22.2 lambda/sec within zone 31, at about position 34. This stack speed is determined by the EM wave velocity of 22.2 lambda/sec at dashed line 50 in zone 19 in the carriage collection section 41. The differential velocity, or impact speed, between the carriage and stack at impact is 4.5 lambda/sec which is sufficiently low that it can be absorbed by conventional shock absorbing devices on each carriage, such as a rubber bumper. After absorbing the impact, the shock absorbing device should not prevent the carriages from abutting at the proper pitch to be in synchronism with a common EM wave propelling the multiple carriages simultaneously, as in zone 19, in the carriage collection section 41. Since the secondaries are not independently accelerating in zone 19 they can all be synchronously driven by a common EM wave in this zone.

For a given total number of carriages in the loop, the stack length changes as a result of changes in the spacing of the carriages in the operational section of the loop and the final velocity reached. If the operational section carriage spacing decreases, the number of carriages in that section increases and the number in the stack forming section decreases. Conversely, if the carriage spacing in the operational section increases, the number of carriages in that section decreases and the number in the stack forming section increases.

The distribution of the carriages in the stack forming section may vary, however, depending on the amount of energy that must be dissipated, based on the carriage final velocity, and the constraints of some "desired results" explained below. In some instances, where it may be desirable to minimize the number of carriages in the loop, it is possible to increase the carriage speed above the second speed as the carriages leave the operational section and enter the stack forming section. This would cause the carriages to reach the stack sooner than the preferred case described where no acceleration occurs in the stack forming section. For the same stack length, when the carriages get to the stack sooner, fewer carriages are required in the stack forming section and, therefore, in the system. The stack length or stack entrance position will be affected by the carriage distribution which is best understood by referring to FIG. 8 to be discussed later.

Deceleration and Stacking

In selecting the deceleration profile, i.e., the speed versus position of the carriage as it decelerates, there are usually many different profiles that will achieve the desired results. The critical parameter that must be controlled is the position of the entrance end of the stack. Two critical conditions must be maintained:

First, the minimum, or shortest, stack entrance position "B" must occur well before the carriages leave the last lower primary (hysteresis) zone 31 as shown in FIG. 3; otherwise, the carriages will not be pressed together and may arrive out of sync with the EM wave in upper primary zone 19, and subsequent control of the carriages in the synchronous acceleration portion is not possible.

Second, the maximum, or longest, stack entrance position must not occur before the carriages have reached the overspeed velocity such as preceding position "O"; otherwise, the impact velocity is no longer accurately controlled and small stack end position variations result in large changes in impact velocity which may eventually damage the carriages.

These two conditions still leave the solution for selecting the precise operating conditions undetermined. Other constraints useful to select EM wave speed setpoints for the return zones will be discussed. In describing the hysteresis motor above, the preferred method to control the hysteresis motor is to keep the force, i.e., current, constant and vary the distance over which the carriage is decelerated in each zone. Some "desired results" in decelerating the carriage at a constant force are the following:

A. Each carriage should essentially lock onto the EM wave in each deceleration zone before leaving the zone, so the carriage speed is checked to a known value in each zone;

B. Each carriage should reach the actual entrance end-of-stack position, S, at least some preselected distance, p (say 4 lambda), after reaching overspeed (position "0") and at least some preselected distance, r (say 10 lambda) before reaching the minimum end of stack position B. This allows for some variation in position S without reaching the limit of the two critical conditions.

C. The distance, d, each carriage travels at the overspeed velocity before reaching the actual end-of-stack position is minimized to less than some preselected distance, u (say 8 lambda). Small values for d causes the carriage to catch up to the stack more rapidly. However, distance d should also be somewhat greater than p to avoid operating near a limit that would require changing several control zone frequency settings for small changes in operating conditions. Distance d, then should be more than p and less than u (4 lambda $<$ d $<$ 8 lambda; actual values will vary with the overall size of the system, number of carriages involved, speeds, etc.)

D. When changing from one operating condition to another, the deceleration should always be altered progressively from one zone to the next in a smooth systematic fashion.

E. The stack should be kept as long as possible within the limits of the other constraints. To accomplish this, the carriage speeds should be kept as high as possible in all zones in the stack forming section. Having a long stack permits the greatest drift in stack length during actual operation before the first critical condition is violated which results in misoperation of the system.

This last "desired result" is an important one that has significant advantages that enhance reliable operation of the system. The carriage travel is most predictable when traveling essentially locked onto the constant speed EM wave. By keeping the speed high and constant for as long as possible in the stack forming section, and then decelerating rapidly in a short distance, the carriages reach the stack quickly which keeps the stack long. At the high constant speeds there is minimal chance for collision; within the stack, obviously, there are no collisions; and the rapid deceleration exposes the carriage to collision for the shortest possible time. Further, the high motor force required for rapid deceleration tends to minimize some of the random effects, such as friction.

The EM wave velocities of the deceleration zones, determined by their drive frequencies, can be selected using any of a number of control algorithms. One such control algorithm uses a set of iterations based upon the percent of energy dissipated in each zone. This percent energy dissipated in a zone is equal to the energy used to decelerate a carriage in that zone given by the average decelerating force, F, times the distance, delta-L, over which the deceleration is occurring; divided by the total possible energy that can be provided by a zone which is given by the force, F, times the length of a zone, L. The algorithm requires that the same percent energy be dissipated in each zone in which a carriage is decelerated. During an iteration, a potential set of deceleration zone speeds are selected. These speeds are then entered into a kinematic model that calculates the motion of the carriage through the system based on known deceleration forces such as from FIG. 7. The initial set of iterations determines where (which zone) the deceleration should begin. The final set of iterations adjusts the percent energy dissipated in each deceleration zone until the results are in compliance with all the constraints, such as the "desired results" mentioned above.

System Stability

Figure 8:
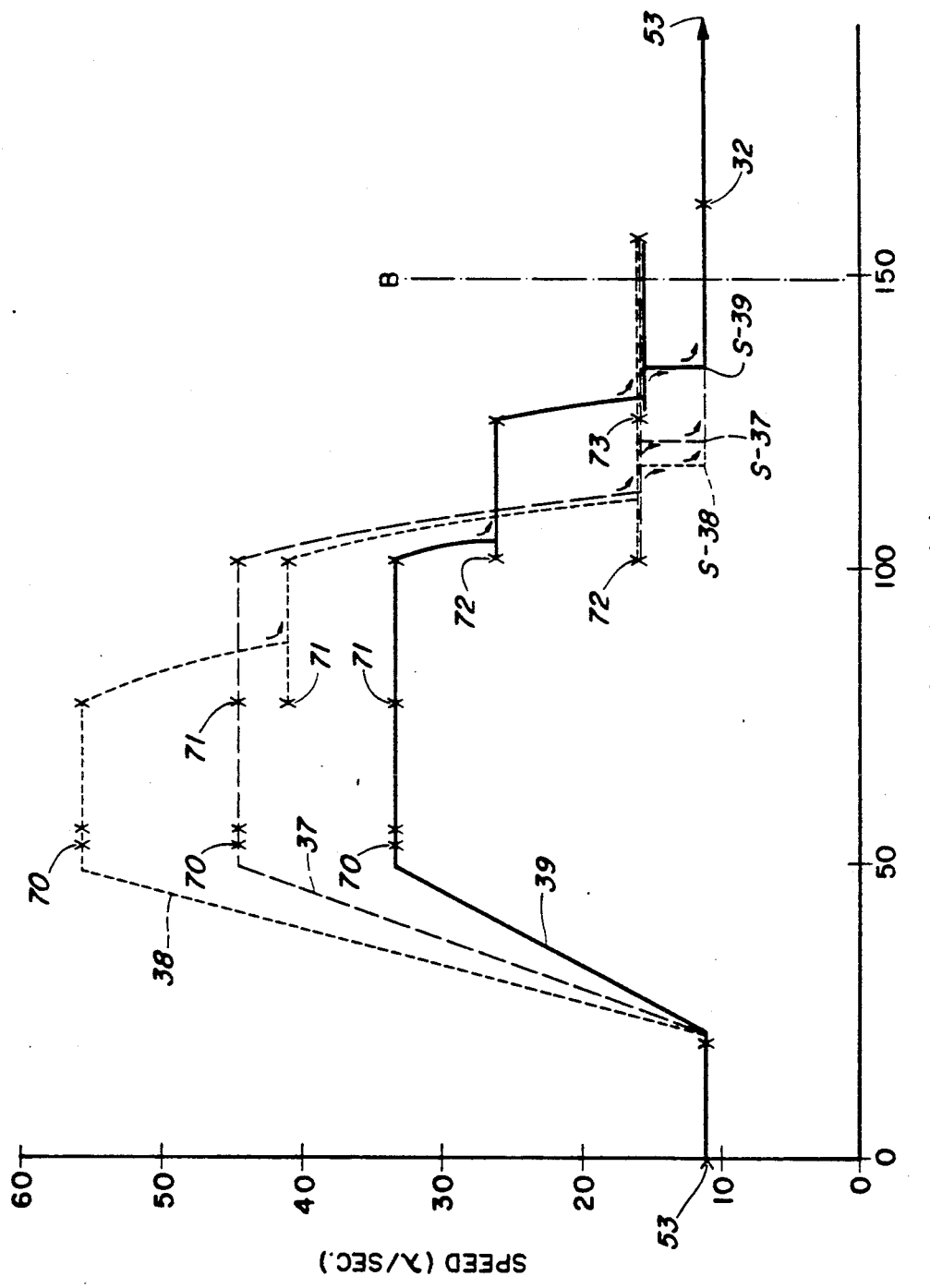
FIG. 8 is a graph of three cases of secondary (carriage) velocity versus position as it travels around the endless loop.

FIG. 8 shows three plots 37, 38 and 39 of speed versus position in the loop, similar to FIG. 3, but three different speed ratios are shown to illustrate how the system compensates and the actual entrance end-of-stack position can shift. Curve 37 shows a first operating condition that achieves a 4:1 velocity ratio, as in FIG. 3, but at lower velocities. Notice the entrance end-of-stack, S, in FIG. 3, is at 135 lambda while in FIG. 4, S-37 is at 121 lambda making the stack longer. The number of carriages in the stack forming section, however, is the same in both cases, but the carriage energy ($\frac{1}{2}$ Mv$^2$) in FIG. 3 where the carriage decelerates from 88.8 lambda/sec is much greater than in FIG. 8 where the carriage decelerates from 44.4 lambda/sec. Since it is preferred that the deceleration force be the same in both cases, in FIG. 3 the force must be applied over a much longer distance to dissipate the greater energy. The length and number of deceleration zones also effects the distribution of secondaries since the carriage cannot start decelerating in the middle of a deceleration zone. The deceleration "step" can only be taken starting at the entrance to the zones as shown at 70, 71, 72 and 73 in FIGS. 3 and 6.

Curve 38 shows an operating condition that achieves at 5:1 speed ratio which increases the separation of carriages in the operational section compared to curve 37 and, therefore, increases the number of carriages in the stack forming section. This results in a slight increase in the stack length as illustrated by the end-of-stack S-38 shifting to the left of S-37.

Curve 39 shows an operating condition that achieves a 3:1 speed ratio which decreases the separation of carriages in the operational section compared to curve 37 and, therefore, decreases the number of carriages in the stack forming section. This results in a slight decrease in stack length as illustrated by the end-of-stack S-39 shifting to the right of S-37.

In spite of the fact that the hysteresis linear motor used to propel the carriages on the return sides of the loop is not always synchronous and no feedback is employed, it, nonetheless, is a stable, robust system under expected variations in individual carriage driving force or friction. This is so for the following reasons:

1. The speed of each decelerating carriage is checked to a set value in each zone as the hysteresis secondary reaches synchronous speed before leaving each zone, thereby limiting the time and distance over which variations can occur.

2. The carriages are driven into the stack at a constant fixed overspeed that permits the carriages to catch up, or the stack length to change rapidly, to compensate for variations in uncontrolled variables, thereby preventing the entrance end of the stack from reaching an inoperable position.
3. The selection of the zone frequency set points in the stack forming section are chosen to cause the entrance end-of-stack position to be initially located between the two extremes discussed that would cause operability problems.

Figure 9:
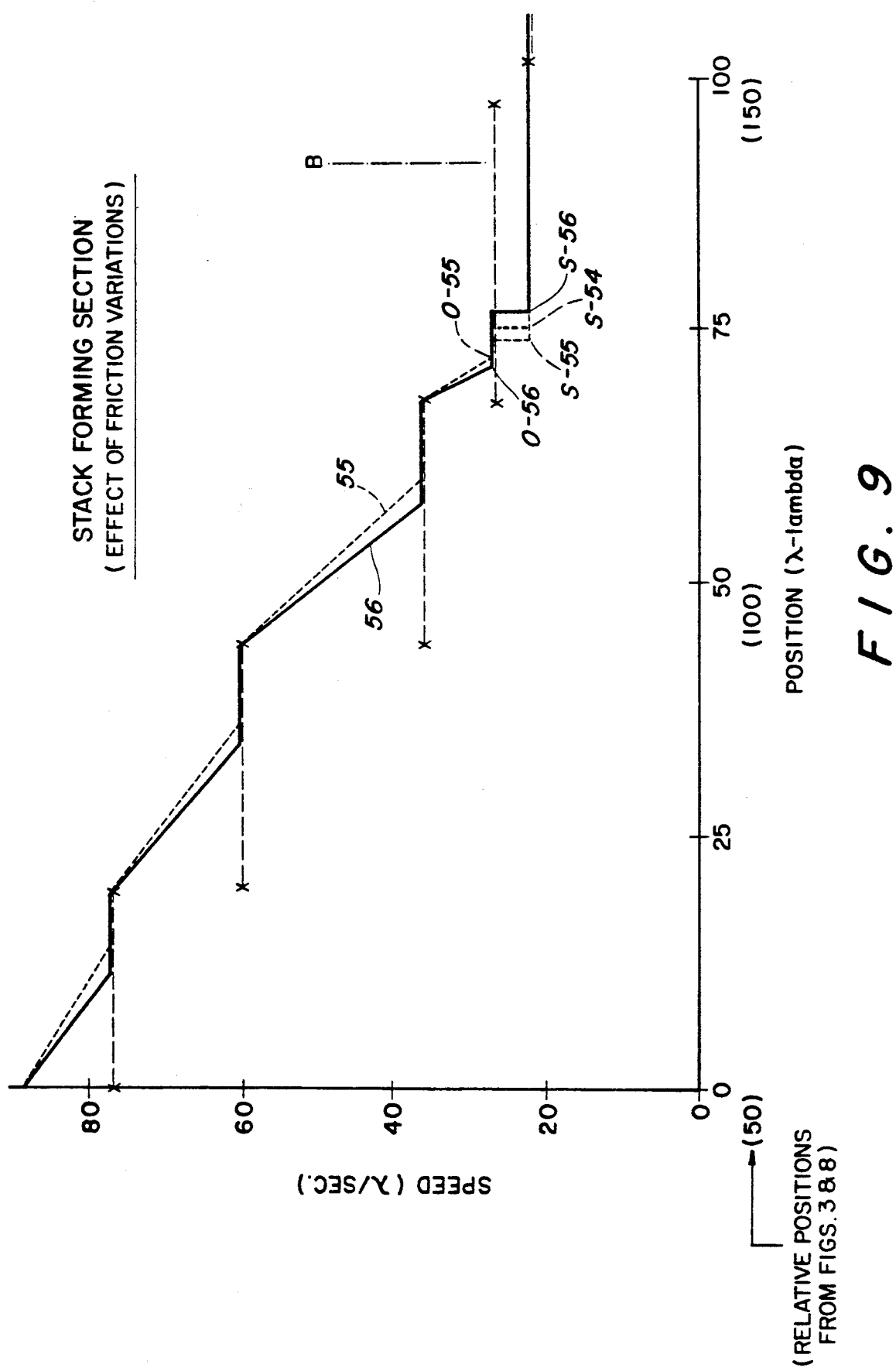
FIG. 9 is a graph of two stable operating curves for the stack forming section showing the effects of changing friction on the carriages.

To illustrate the ability of the system to be self-compensating, it is important to understand that the total time a carriage spends in the stack forming section is a fixed time for a given operating condition for the synchronous operational section. For each carriage leaving the operational section and entering the stack forming section, a carriage must leave the stack forming section, enter the stack and thereby return a carriage to the operational section. FIG. 9 shows the effect in the stack forming section of variations of an uncontrolled variable, such as carriage friction, on the stability of the system.

To set up a base case condition in a model of the system for evaluating friction variations, the operational section conditions in FIG. 3 were maintained and the stack forming section conditions were varied by assuming changes in the value of friction for the carriages. To exaggerate the effect to a worst case condition, the base case carriage friction force was assumed to be about 17% of the average carriage deceleration force. (Ordinarily friction forces are more like 1¾% as they were for FIG. 3). For this base case the operating speed (related to drive frequency) for each deceleration zone EM wave was determined. In FIG. 9, these speed values and other variables were held constant while average carriage friction was varied plus and minus 50%. For the base case with 17% friction, the stack position S-54 was 75.3 lambda. The deceleration curve for the base case is omitted for clarity. Dashed line curve 55 shows the result of decreasing the carriage friction to about 8½%. The carriages now do not decelerate quite as rapidly (since friction aids deceleration) therefore the carriages reach the stack sooner so the stack grows slightly to compensate by moving left to position 74 lambda at S-55. With an increased stack, however, the carriages travel longer at the lower stack speed so the total time in the stack forming section remains the same and the new stable operating condition of curve 55 is established.

Curve 56 shows the opposite condition of assuming an increase in the average friction of the carriage to 25½%. In this case the carriage decelerates more rapidly and takes longer to reach the stack which has shortened slightly to compensate by moving right to 76.7 lambda at S-56. Now, however, the carriages travel longer at the higher overspeed velocity so the total time in the stack forming section remains the same and the new stable operating condition of curve 56 is established. It is important to note that in both curves 55 and 56, the stack entrance positions S-55 and S-56 did not reach critical limits 0-55, 0-56 or B for that operating condition.

In the cases shown here, the acceleration portion is short so the number of carriages affected by spacing changes is small and the stack entrance position variations can be measured in a few lambda. In loops having a long acceleration portion which may also include a longer constant speed portion than is shown at 44 FIG. 3, many more carriages are involved before reaching the stack forming section, but the hysteresis motor system works just as well in this case and can easily accommodate large changes of one hundred lambda or more in the stack entrance position.

On-Line Changes

During start up from zero speed and during changes from one velocity ratio to another as shown in FIG. 8, the EM wave velocities in each zone in the stack forming section must be adjusted periodically during operation. This is required to maintain a stable stack entrance condition as the carriages change energy (speed) and/or spacing entering the stack forming section. Updating the stack forming section EM wave speeds by resetting the drive frequencies to newly calculated values about every ¼ second will achieve the required stability in the stack forming section. The carriage speed and spacing entering the stack forming section is known from the predetermined operating conditions in the operational section, which are discussed in the Hommes and Keegan U.S. Pat. No. 4,675,582 referenced previously. System computer 51 controls the stack forming section zone drive frequently adjustments and coordinates them with the operational section operating conditions. Such functions of a computer control system are known to one skilled in this art so further discussion of control details is not necessary.

System Variations

In the version of the endless loop concept shown in FIGS. 1 and 4, the linear motor primaries are not continuously acting on either one or the other secondary as a gap exists between where the lower primary ends at 74 and the upper primary begins at 32.

In a modified system, along the stack forming section the lower primary can also have gaps between zones to save the cost of primary and for structural convenience. Since the carriages are being slowed from an elevated speed, they have sufficient inertia to pass across the gaps in a predictable manner. Some form of auxiliary or operator assist can be provided in the gaps as desired to insure carriages do not become "stranded" there at shutdown.

The carriage collection section may also contain gaps in zone 19. For instance, zone 19 can consist of two straight segments preceding and following the turnaround curve with no primary present in the curve since curved primaries are difficult and expensive to fabricate. The two separate straight segments would be operated together like a single zone and would be mechanically spaced at the same pitch as the secondaries on the abutted carriages filling both segments and the curve. The abutted carriages would be pushed through the unpowered curve.

The concept of using a carriage having a synchronous and hysteresis secondary has been described where only one secondary was acted on by a primary at a time. It is also contemplated that whenever the synchronous secondary is being acted on, a primary could be added to also act on the hysteresis secondary at the same time using the same or a different speed EM wave. This would have the advantage of providing additional driving force on the carriage and could be used to damp out speed oscillations associated with the synchronous secondary.

It is also contemplated that the synchronous secondary and upper primary could be eliminated and the lower primary could be extended to propel the hysteresis secondary completely around the loop. In the carriage collection section, the hysteresis secondary would be propelled synchronously to insure a known position versus time for the carriages at one point in the loop. On the operational side of the loop the hysteresis secondary can be propelled either synchronously, using the same zones and EM wave segments as were used for the synchronous secondary, or asynchronously and essentially synchronously in a manner opposite that used on the stack forming side. When the hysteresis secondaries are propelled asynchronously, the percent difference in loading on each carriage at a given position in the system should be minimized to insure predictable performance from carriage to carriage. This is required so the time it takes each carriage to pass through the operational side is predictable and repeatable for each carriage. This will decrease the possibility of uncontrolled collisions during decelerations on the stack forming side.

In a preferred embodiment of this invention linear motors are used for propulsion throughout, however, the carriages also may advantageously be propelled by a combination of a hysteresis linear motor and a mechanical sprocket and/or screw engaging the carriages. For instance, in a film tenter system, such as that shown in U.S. Pat. No. 3,932,919 to Hutzenlamb, for example, a sprocket engages the carriages in a stack and propels them at a first speed synchronously, in non-slipping engagement with a drive means whose speed and position can be controlled precisely, and acts as a carriage collection section. The carriages are then passed in abutment (i.e., synchronism is maintained) to a screw with increasing pitch that is synchronously geared to the sprocket. The screw synchronously spaces the carriages apart and propels them synchronously to a second speed, acting as an operational section. At this point, the hysteresis linear motor of the instant invention can be used to engage the carriages and propel them at the second speed, then return the carriages back to the stack by decelerating them to a third speed and abut them with the stack at a controlled impact speed, and press the carriages into the stack, thereby acting as a stack forming section. Such a system would eliminate the costly, complex, and speed limiting system (used in this patent) of a chain, decreasing pitch screw, and adjustable pitch screw elements to return the carriages, which elements must be changed each time a different increasing pitch screw is selected. To accomplish improved operation, each carriage would receive a hysteresis secondary, and a primary with a plurality of zones and controls would be located at appropriate positions along the endless loop. The hysteresis linear motor would be operated according to the teachings of this invention to return the carriages, to the stack.

Tenter Frame

In the preferred embodiment of this invention, linear motors are used to propel carriages throughout opposed loops of a tenter frame to draw a web of material, such as plastic film. In operational sections of the loops, individual pairs of carriages are controlled to space them from adjacent carriage pairs where the film is longitudinally drawn in the film processing section of the tenter. A further alternative embodiment exists wherein there are passive carriages introduced between each of the carriages actively powered throughout the loops by the linear motors, the passive carriages being unpowered in the carriage collection and operational sections of the tenter frame. Both the active and passive carriages are propelled by linear motors in the stack forming sections.

In greater particularity, and referring specifically to FIGS. 10, 11, 12, and 13, an apparatus or tenter frame 901 is shown which is suitable for drawing a web of sheet material 961, such as plastic film, to improve its properties. The tenter of FIG. 10 consists of two opposed, mirror-image, symmetrical, clip loops 900 and 902 that move the film along forward sides of the apparatus, to transport, draw, and stabilize the film in the transverse and machine directions simultaneously. The transverse direction (TD) drawing is accomplished by diverging the film clip guide tracks in each loop in a conventional manner. The machine direction (MD) drawing is accomplished by accelerating pairs of active clip carriages, such as 906 and 908, with synchronous linear motors to separate them from adjacent active clip pairs, such as 898 and 899, along the forward sides of the tracks to draw the film between adjacent clips. Unpowered passive clip carriages are placed between the active clip carriages to decrease film edge scalloping. As the clip carriages reach the ends of the forward sides of the loops, they are engaged by friction wheels 993 and 995 on the return sides that open the clips to release the film edge bead and transport the carriages from the first primaries on the forward sides to the second primaries on the return sides. Both the active and passive carriages are then decelerated with linear hysteresis motors on return sides and are abutted in stacks, following which the active carriages are engaged again by the synchronous linear motors before leaving the return sides. The clip carriages are then recirculated to the entrance of the forward sides for engagement again with the entering film. A control system, supervised by computer 1018, precisely controls several hundred active clip carriages simultaneously and independently on the forward (film) sides of each loop and brings all clip carriages together without damaging collisions into stacks on the return sides.

In the operation of this apparatus a web of film to be drawn is supplied from a supply source 916, such as a supply roll or from a film casting operation and moved by appropriate means into the tenter frame 901 between the pair of elongated endless track loops 900 and 902 positioned opposite each other. The two loops 900, 902 are symmetrical, with elements of loop 900 mirrored in loop 902. Where convenient in describing elements of the loops, an element will be shown in one loop, and for the other loop it will be referred to by a prime (') designation. The carriages, such as active carriages 906, 908, 927 and 928, are propelled along the forward sides 910 and 912 of loops 900 and 902 respectively in paired symmetry. That is, the carriage pairs such as 906 and 908 are aligned along a line 914 and carriage pairs such as 927 and 928 are aligned along a line 925, both lines drawn perpendicular to center line 904 centered between the forward sides of the two loops.

Each track loop has a number of portions which fall within the forward sides 910 and 912 and the return sides 903 and 923 of the tenter frame. First portions of the tracks define a transport section 918 of the tenter frame where the film is conditioned prior to drawing by heating it to the desired temperature without permitting stretching to occur. Second portions of the tracks define the key drawing section 922 on the forward sides of the tenter frame. These portions of the tracks typically diverge outwardly from a machine center line for drawing the web in the transverse direction at the same time it is drawn in the machine direction. Third portions of the tracks are connected to the second portions on the forward sides of the tenter frame. These portions are opposite each other, generally equidistant from the centerline of the frame, and define between them a stabilizing section 926 of the apparatus. Some small amount of MD and TD drawing or relaxing may occur in the stabilizing section. The dividing line 924 between the drawing and stabilizing sections preferably can be moved up and downstream in the tenter as film processing requirements vary which will be discussed later.

These first, second and third portions of the tracks define together the film processing section making up the forward sides 910 and 912 of the tenter frame. The tracks are completed on the frame by fourth portions making up the return sides 903 and 923 where the tenter clips are disengaged from the film. The return sides connect the third portions to the first portions of the tracks to complete the endless loops.

Figure 10:
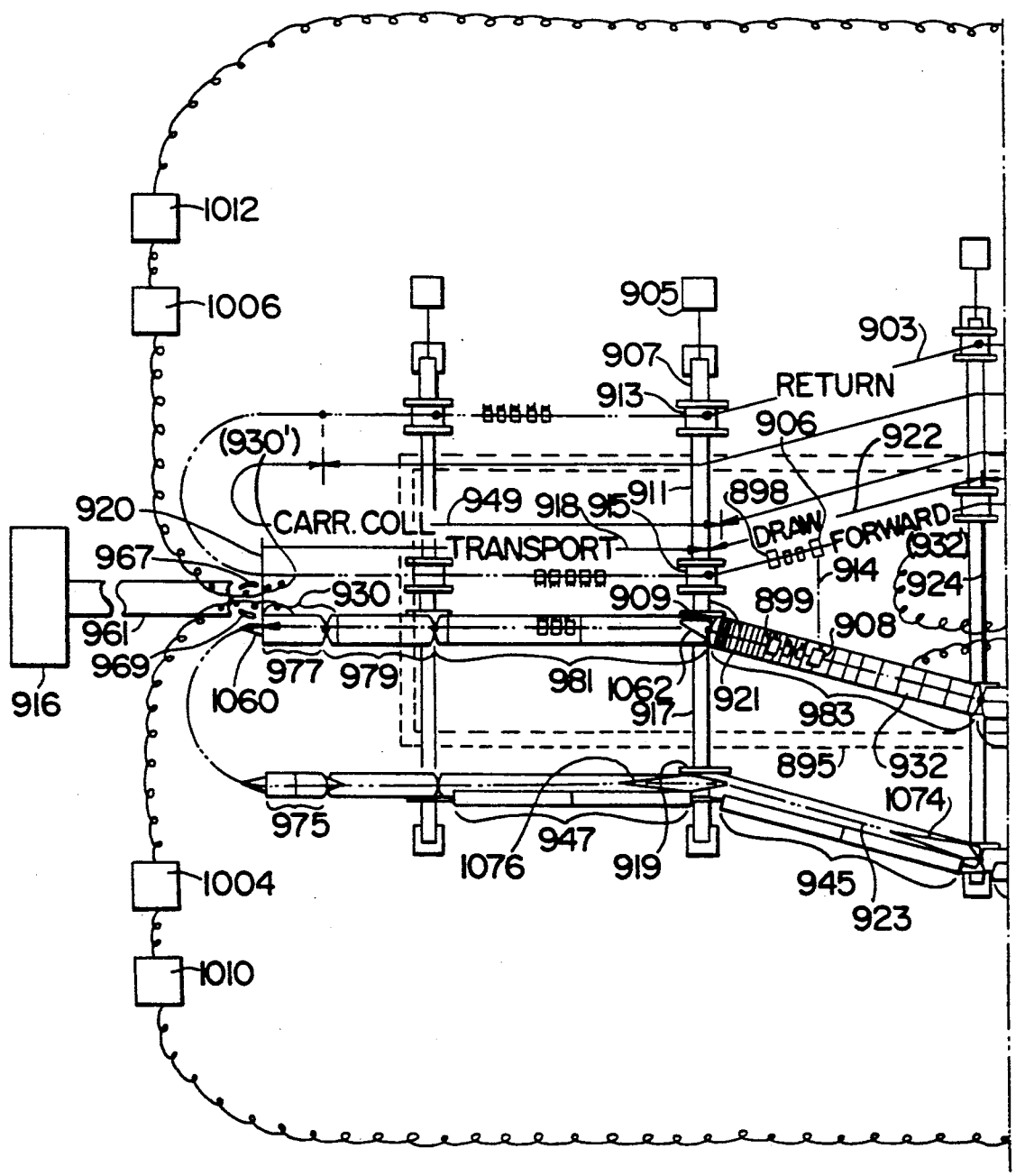
FIG. 10 is a schematic top plan view of a simultaneous biaxial tenter frame of the invention.
Figure 10:
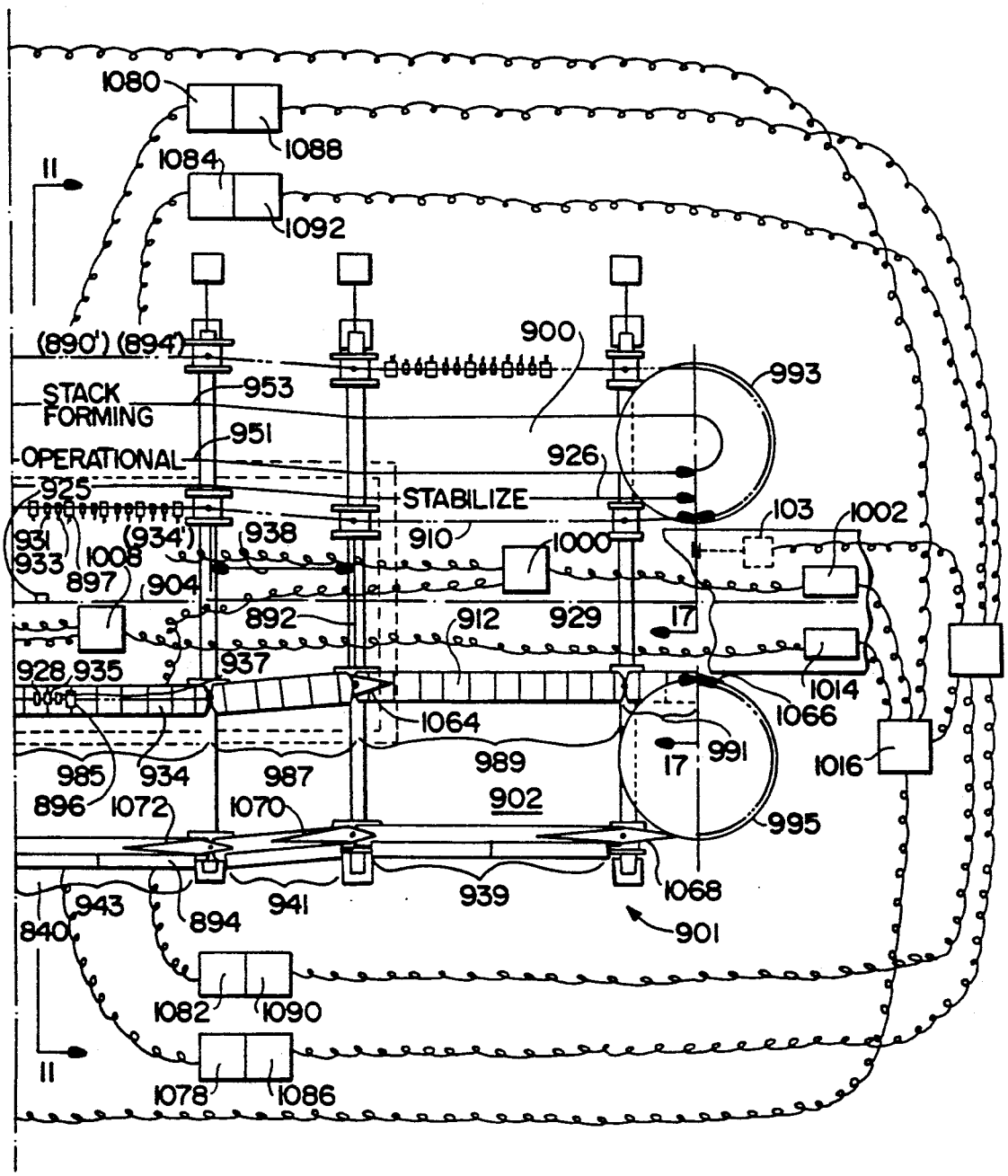

Referring to FIG. 10, a plurality of active carriages such as 927, 928, 896, and 897 are positioned for movement on the elongated track loops 900 and 902. A plurality of passive carriages such as 931 and 933, 935 and 937 are positioned between active carriages 927 and 897, and 928 and 896 respectively as shown. Both active and passive carriages have tenter clips 959 attached to them, as best seen on the active carriages in FIG. 12, which are adapted to grip the edges of the film as it enters the tenter frame 901 and to release the film after it has been moved by the carriages through the forward sides. On the forward sides of the tenter, the passive carriages are first propelled by entrapment between the active carriages and are then propelled by the attached film as the active carriages separate and stretch the film. After releasing the film, both active and passive carriages are propelled along the return sides of the tenter frame into position to repeat the drawing operation. FIG. 14 shows the active and passive carriages, such as 927, 931, 933, and 897, as they would appear in the transport section on the forward sides of the tenter where they are abutted and are engaging the edge bead of the unstretched film. In FIG. 15, the same carriages are shown as they would appear in the drawing or stabilizing sections of the tenter where the active carriages have separated, thereby stretching the film, and the passive carriages, due to their gripping engagement with the film, are propelled by the moving film itself. The intermittent line in FIG. 15 depicts the excessive scalloping of the film edge that would occur if the passive clips were not present.

The active clip carriages have synchronous secondaries attached to them that are electromagnetically engaged on the forward sides and the ends of the return sides by the mechanically separable first primaries 975, 977, 979, 981, 983, 985, 987, 989, and 991 in loop 902. Loop 900 has corresponding first primaries in mirror image positions to loop 902. The linear synchronous motor control system previously described is applied to the first primaries to control the propulsion of the active carriages, such as 906 and 908 along the forward sides 910 and 912 of the track paths. Computer 1018 supervises control of the system. The two forward sides are connected and coordinated in a manner to provide total control over each opposed pair of clips as they move through the drawing section and other film processing sections.

The active and passive clip carriages both have hysteresis secondaries attached that are electromagnetically engaged on the return sides of both loops by the mechanically separable second primaries 939, 941, 943, 945, and 947 in loop 902. Loop 900 has corresponding first primaries in mirror image positions to loop 902. Paired groups of coils in the second primaries on the opposed loops receive the same operating instructions from computer 1018 for control purposes. The linear hysteresis motor control system previously described is used to control the propulsion and stacking of the active and passive carriages and maintains pressure abutment of the carriages in the stacks as the synchronous secondaries on the active carriages are engaged again by the first primaries, such as 975 in loop 902, before leaving the return sides.

In a typical application, the web of material or film 961 is formed upstream at 916 and is fed to the tenter frame entrance at 920. The tenter clips on the opposed active pairs of carriages grasp sequentially successive areas along opposite edges of the film at 920 and propel it at a first constant speed through the transport section 918 where the film is heated without drawing. The passive clip carriages interposed with the active ones in the transport section also grasp the film edges and are carried along by abutment with the active carriages. The tracks then diverge at 921 thereby drawing the film transversely while at about the same time the opposed active pairs of carriages are individually accelerated causing them to separate from adjacent pairs and simultaneously draw the film longitudinally in the drawing section 922. Heating of the film in the oven enclosure 895 is continued in the drawing section to control the film temperature during drawing. The tracks are then made generally parallel and the individual opposed pairs of carriages reach a second speed at the end of the drawing section at 924 and the film is stabilized in section 926. The speed of the carriages and draw ratio of the film may change slightly in the stabilizing section. Temperature control of the film continues in the stabilizing section and may consist of continued heating or cooling. The film is then released from the tenter clips at the tenter frame exit at 929 and continues to a conventional winder. The individual active and passive carriages in each loop are then returned along return sides 903 and 923 of the two endless carriage loops to the entrance 920 of the tenter frame.

If it is desired to slacken or relax the film in the machine direction in the drawing or stabilizing sections, the speed of the active carriages as controlled by the linear motors may be gradually or progressively decreased slightly according to any desired program thereby providing direct control of the shrinking and flatness of the film. TD relaxation is also possible in the stabilizing section by slightly converging the tenter frame tracks as shown at 938 to move the tenter clips closer together laterally.

The symmetry of motion between carriages along the forward sides of loop 900 and loop 902 is assured by:
    providing a linear motor primary adjacent each track, with each primary including a plurality of groups of coils with the groups of coils in one primary sized to match opposed groups of coils in the other primary and with each of the opposed groups of coils being electrically joined and defining a single control zone;

providing a synchronous secondary attached to each of the active carriages, the attached secondary guided adjacent one of the primaries;

providing a continuous supply of closely spaced or abutted active carriages to each loop initially in synchronism with matching electromagnetic waves developed in the groups of coils in a control zone at the entrance of the tenter frame; and providing predetermined coordinated control instructions simultaneously for all coil groups in each control zone of the opposed primaries to thereby develop predetermined coordinated EM waves in all control zones so the opposed pairs of active carriages in the two loops are propelled in symmetry through each control zone and from one control zone to the next through the tenter frame.

The synchronous secondaries lock onto the electromagnetic waves developed by the primaries and as long as the active carriages are continuously fed in alignment to the forward sides of the loops, and the opposed groups of coils in each control zone simultaneously receive alternating current developed from the same predetermined control instructions, which are simultaneously coordinated with adjacent control zones' instructions, the active carriages will remain in symmetry as they are propelled along the forward sides of both loops.

The operation of propelling the tenter carriages around a single loop is similar to the system shown in FIGS. 4, 5 and 6. The control of carriage propulsion along a forward side of each loop by predetermining and coordinating the control zone waveforms is described in our previously mentioned U.S. Pat. No. 4,675,582.

FIG. 4, represents one of the two loops of the tenter frame for propelling the carriages. The carriage collection section 41 and operational section 42 of FIG. 4 are operated as previously described to control the propulsion of the active carriages through the carriage collection sections 949/949' and through operational sections 951/951' on the forward sides 910 and 912 of FIG. 10. The stack forming section 43 is operated as previously described to control the propulsion of both active and passive carriages throughout the stack forming sections 953/953' on the return sides 903 and 923 of FIG. 10. The carriage collection sections 949/949' are operated to propel the active carriages through the remainder of the return sides.

The control zones for the tenter frame loops comprise opposed groups of coils that are electrically joined. The groups of coils are shown as blocks in the first and second primaries of loop 902. For clarity in FIG. 10, only loop 902 has the primaries and coil groups shown, but they are also present in mirror image positions in loop 900, and for discussion purposes are designated by the number in loop 902 with a prime (') suffix. By opposed groups of coils then is meant, for instance:

the group of coils 930 in first primaries 977 and 979 of loop 902 which are electrically joined with the group of coils 930' of the corresponding first primaries 977' and 979' of opposed loop 900 which would make up a control zone A;

the group of coils 932 in first primary 983 of loop 902 which are electrically joined with the corresponding group of coils 932' in first primary 983' of opposed loop 900 which would make up a control zone B;

the group of coils 934 in first primary 985 of loop 902 which are electrically joined with the corresponding group of coils 934' in first primary 985' of opposed loop 900 which would make up a control zone C.

It is important to note that the groups of coils 930, 930' are from two mechanically separable first primaries. The significance of this will be discussed later.

The groups of coils of the first primaries just discussed are adjacent the synchronous secondaries on the active carriages along the forward sides of the loops. They correspond to zones such as 19, 20, 21 and 22 in FIG. 4. Wherever the carriages are to be spaced apart, as in the operational sections 951/951', the control zones are sized so that for a range of desired operating conditions, there will never be more than one pair of active carriages at a time in a control zone as the active carriage pairs are propelled in symmetry along the first primary. This condition does not apply, however, in the first constant speed control zones, such as 981, 981' (FIG. 10), where the carriages are all closely spaced or abutted at an integral multiple of lambda and are traveling at the same speed; there can be many carriage pairs in these control zones.

Tenter Carriage, Track, and Linear Motor

Figure 11:
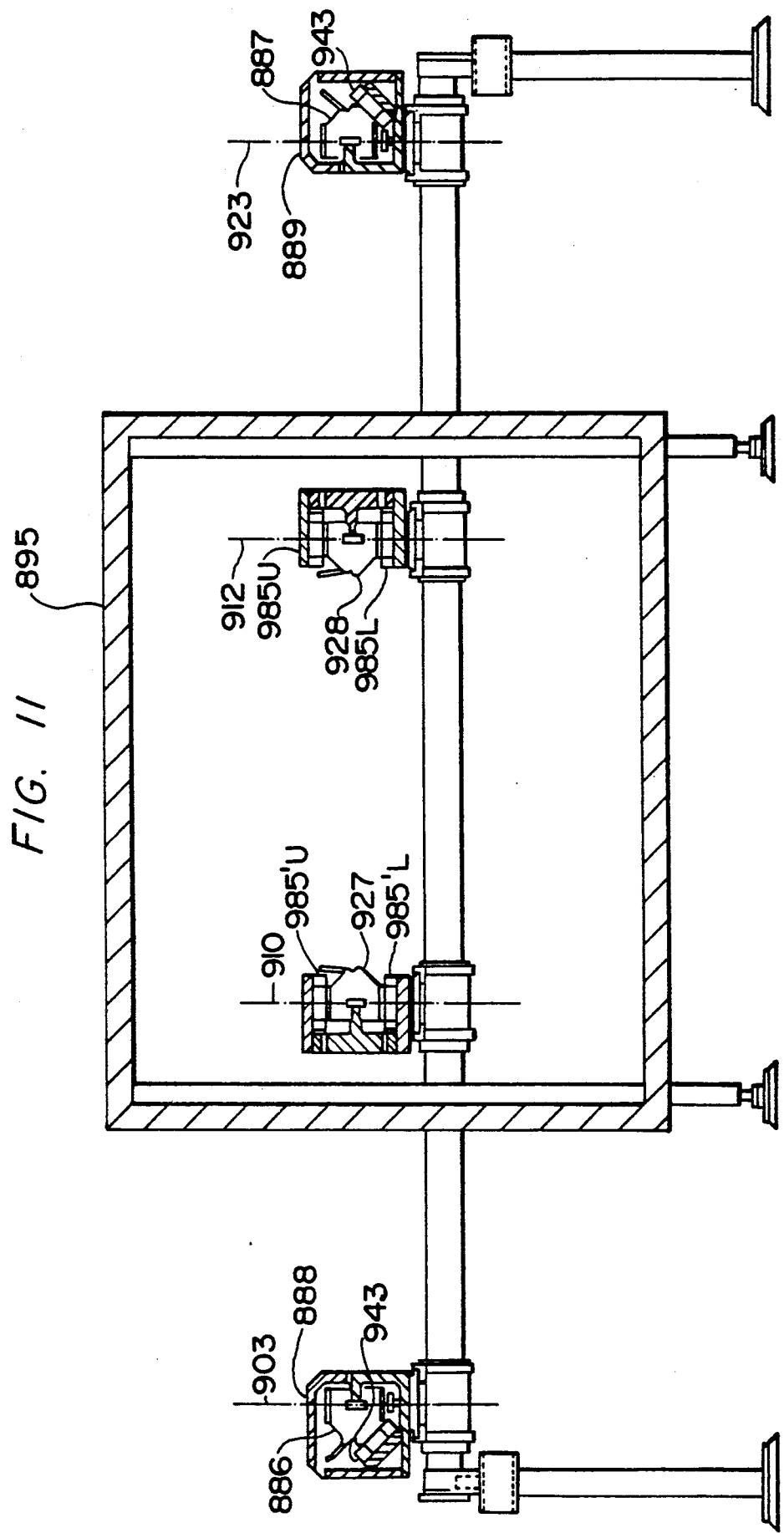
FIG. 11 is a typical cross-section of the two opposed loops taken along line 11—11 in FIG. 10.

FIG. 11 shows a typical cross-section taken along lines 11—11 in FIG. 10 through the forward and return sides of the loops 900 and 902. Shown in elevation are active carriages, such as 927/928 on the forward sides 910 and 912, and 886/887 on return sides 903 and 923 respectively. Oven enclosure 895 encloses much of the forward sides to control film heating, while track enclosures 888 and 889 enclose much of the return sides to facilitate control of clip temperatures to prevent sticking to, or quenching of, the film when initially grasped by the clips. The track enclosures also function as safety guards for the moving carriages.

Figure 12:
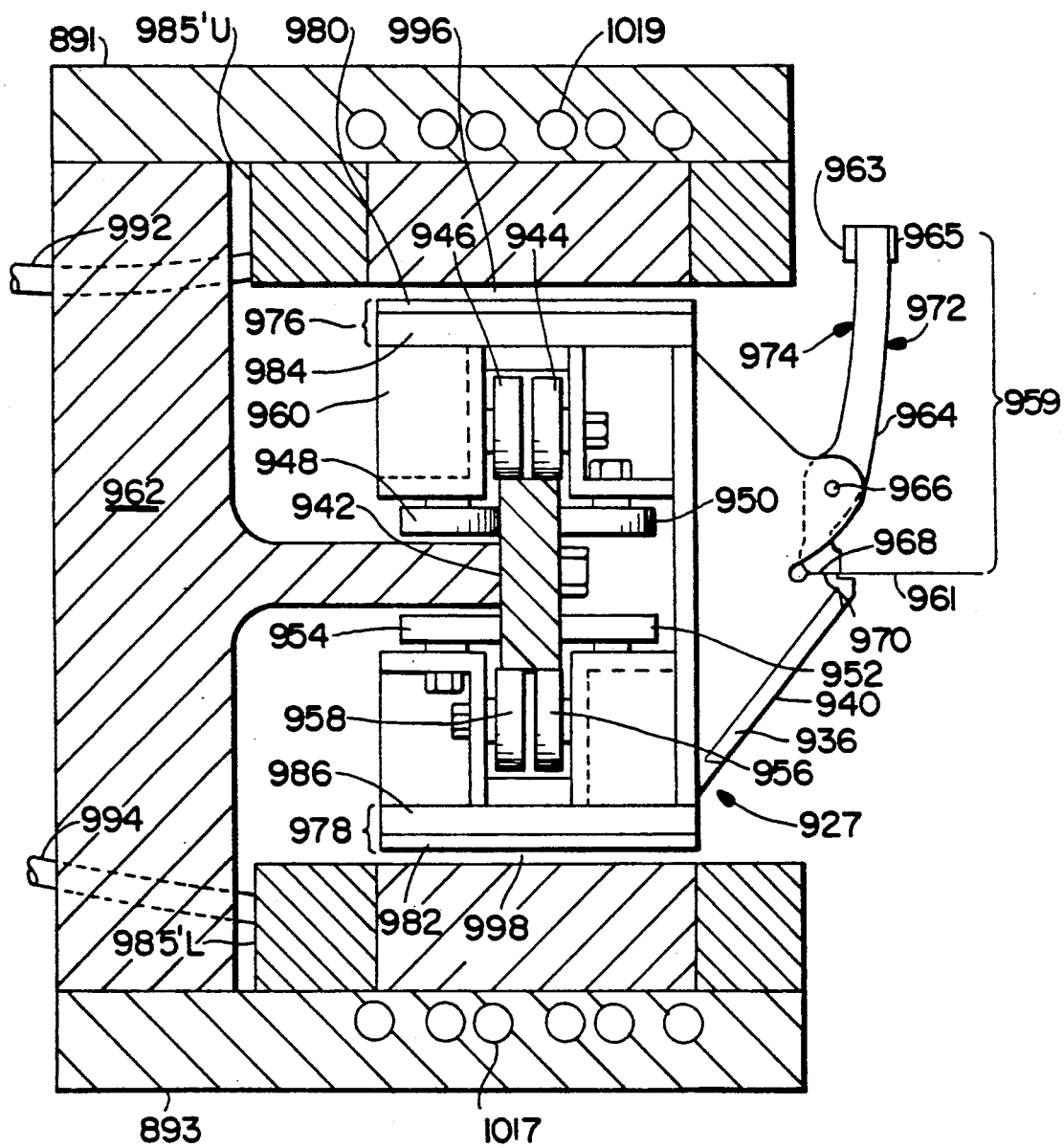
FIG. 12 is typical enlarged cross-section of the active carriage adjacent the elongated primaries in the film processing section seen in view 12 in FIG. 11.
Figure 16:
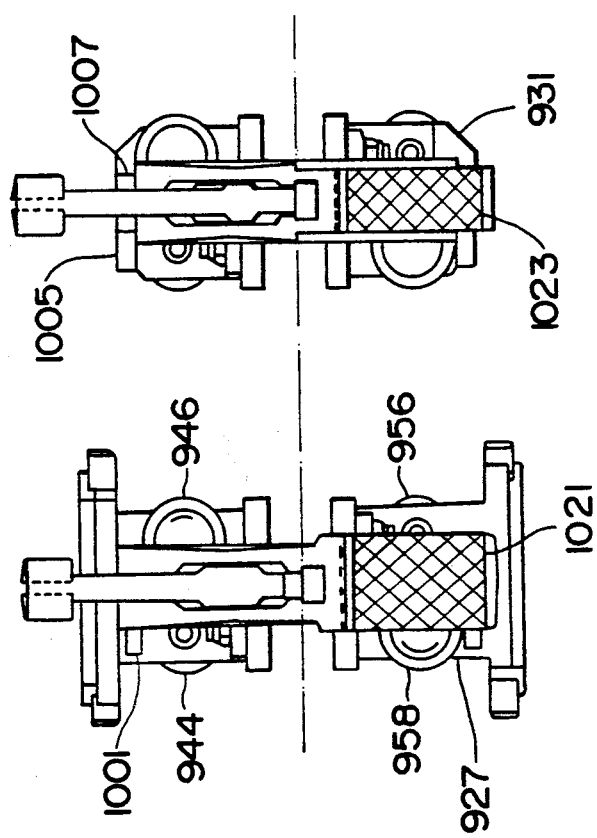
FIG. 16 is an elevation view of an active and passive carriage seen in view 16—16 in FIG. 15.

FIG. 12 shows an enlargement of view 12 in FIG. 11 through the forward side 910 of loop 900. Active carriage 927 is shown in side elevation. Enlarged plan views of the active and passive carriages are shown in FIGS. 14 and 15 and front elevation views are seen in FIG. 16. A guide track such as 942 is provided that runs completely around loop 900 along both forward and return sides and connects the forward and return sides. The track is supported by attachment to frame 962. The track is a flexible structure to permit smooth curving at inflection points and is shown for example in U.S. Pat. No. 3,456,608, incorporated herein by reference, and U.K. 1,504,450. The carriage is supported on guide track 942 by the eight rollers 944, 946, 948, 950, 952, 954, 956 and 958 that are rotatably mounted on carriage body 960. The rollers are alternately aligned and offset in the MD or longitudinal direction (into FIG. 15) to provide a stable support for the carriage. That is, also referring to FIG. 16, horizontal track surface rollers 944 and 958 are longitudinally aligned, while horizontal rollers 946 and 956 are also longitudinally aligned but are longitudinally spaced, or offset, from rollers 944 and 958. Likewise, vertical track surface rollers 948 and 952 are longitudinally aligned, while vertical rollers 950 and 954 are also longitudinally aligned but are longitudinally offset from rollers 948 and 952. Other numbers of rollers or sliding elements may be utilized as long as the carriage is stably supported for free sliding or rolling movement along the guide track. Alternate track arrangements are also possible. The rollers keep the carriage closely positioned on the track and carry loads produced by the weight of the carriage, the tension of the film 961 grasped by the film clip, the thrust of the motor, and the unbalanced magnetic forces between the primary and secondary.

As best seen in FIGS. 14 and 15, two passive carriages, such as 931 and 933, fit between every two active carriages, such as 927 and 897. The passive carriages are similar to the active carriages but without synchronous secondaries attached. As such, the passive carriages fit vertically between the overhanging synchronous secondaries of the active carriages when the active carriages abut with typical stops 997 and 999 of carriages 927 and 897. The horizontal and vertical rollers on each carriage are staggered as previously described so "nesting" of the rollers occurs between the adjacent carriages. If smaller rollers were used or a greater spacing between carriages were employed, such "nesting" would not be required. To achieve large draw ratios, however, close initial spacing of the film clips is desired to minimize scalloping.

Referring to FIGS. 14 and 15, each carriage has an elastomeric bumper to absorb the controlled impact that occurs as the carriages abut in the stack forming sections of the loops. Low level impacts may also occasionally occur within a return side control zone as a carriage friction load may vary slightly or the air gap between the hysteresis secondary and return side primary may slightly vary from one carriage to another. Referring to the hidden lines in FIGS. 14 and 15, active carriage 927 has a bumper 1001 and impact surface 1003. Passive carriage 931 has a bumper 1005 and impact surface 1007. In operation, adjacent bumpers and impact surfaces, such as bumper 1005 and surface 1003 come together as shown to cushion impact between adjacent carriages. Only when all intervening bumpers between active carriages 927 and 897 are depressed some finite amount do stops 997 and 999 on carriages 927 and 897 come into contact as in FIG. 14.

Film Clip

Both the active and passive carriages have film clips 959 attached as typically shown in FIG. 12. Carriage body 960 has attached a film clip lever 964 pivotably connected at 966. A gripping surface 968 is pivotably movable to clamp the film against anvil surface 970 which stops the pivoting movement. The film 961 is gripped by forcing the lever 964 in the direction of arrow 972 and is released by forcing the lever in the direction of arrow 974. The upper end of lever 964 forms cam following surfaces 963 and 965. In FIG. 10, cam surfaces 967 and 969 at the entrance of the tenter frame act on surface 965 on the carriages to move the lever to grip the film, and the peripheral surfaces of the friction wheels 993 and 995 at the tenter frame exit act on surface 963 on the carriages to move the lever to release the film. Suitable tension devices such as springs may be connected between lever 964 and carriage body 960 to maintain the clip in the open and closed position such that the clip is forced into an opposite position only under the action of the cam surfaces. This arrangement is preferred so that cams 967, 969, and the friction wheels only need be placed at the entrance and exit of the tenter frame to open and close the clips. The longitudinal dimension (into FIG. 12) of surface 968 and anvil 970 is narrow to permit free longitudinal movement of the film as it is stretched between clips. It has been found that the film also stretches longitudinally where it is gripped by the clip. Clips for simultaneous biaxial stretching of film are disclosed in the previously mentioned tenter frame patents and U.S. Pat. No. 3,391,421 and need no further explanation.

Secondaries

In FIG. 12, on the top and bottom of active carriage body 960 are attached synchronous secondaries 976 and 978. They resemble the synchronous secondaries described in FIG. 2 and in U.S. Pat. No. 4,675,582 (previously incorporated by reference). In FIG. 12, they each consist of magnets located at 980 and 982 and back iron at 984 and 986 similar to the secondary 3 shown in FIG. 2. As better shown in FIGS. 14 and 15, the magnets at 980 would consist of one magnet oriented with its north pole facing outward and a second adjacent magnet, spaced one lambda away, with its south pole facing outward. As is shown in FIG. 14, referring to secondaries 927 and 897, it is preferred that secondaries on adjacent active carriages have the disposition of their poles reversed. Also when adjacent active carriages are at their closest spacing, which in the tenter frame invention is with active carriage bodies abutted, the magnetic edges of the secondaries would have a one lambda space between them as is explained in the '582 patent. Referring to a single active carriage such as 897, the magnet near the forward side of the carriage on the top secondary 976 and the magnet near the forward side of the carriage on the bottom secondary 978 would both have their outward facing poles the same. For example, both top and bottom secondaries would have north poles near the forward side of the carriage. As is shown in FIGS. 14 and 15, the magnets are preferably angled with respect to the track centerline 1009. This helps to remove force fluctuations on the moving carriages that are caused by attraction of the magnets to the teeth of the laminated primary which are oriented perpendicular to the track centerline as seen in FIG. 21. The magnets on the top of the active carriage are preferably oriented opposite the angle of the magnets on the bottom of the carriage. The magnets are also preferably surrounded on the top and sides by a non-magnetic, electrically conductive cage 1011 (FIG. 14), such as copper or aluminum, to contain the magnets and provide dynamic electromagnetic damping to the moving cartridges (a thin top covering is omitted in the figures for clarity). The one lambda pole-free space between active carriages is physically established by the abutting stops 997 and 999 on adjacent active carriages 927 and 897.

Referring to FIG. 12, at position 940 on the angled surface of the active carriage beneath the film clip is a hysteresis secondary which resembles the hysteresis secondary discussed in reference to FIG. 2. It consists of hysteresis material 936 mounted on the back iron comprising the carriage body 960. At this same relative position on the passive carriages, there is also a hysteresis secondary. The hysteresis material is preferably unmagnetized Alnico V and, as shown in FIG. 12, it is the same thickness and height on both active and passive carriages. FIG. 13 is an enlargement of view 13 in FIG. 11 through the return side 903 of loop 900. Referring to FIG. 13, in the position 940 on both the active and passive carriages, the hysteresis secondary is adjacent the second primary (943′) for engagement by the second primary EM wave. Since the active and passive carriages frequently have a different mass and therefore a different kinetic energy at the same speed, the size of the hysteresis secondaries on the respective carriages is different as can be seen in FIG. 16 which shows an elevation view taken along line 16—16 of FIG. 15. The hysteresis secondaries are shown in crossed lines where it can be seen that the active carriage has a wider area 1021 than the passive carriage area 1023. When both secondaries are engaged by the same second primary EM wave, a larger force is developed on the active carriage than the passive one. This larger force is proportional to the greater mass of the active carriage and causes both carriages to be slowed (negative acceleration) at the same rate since $a = F/m$.

Aligning the Active Carriage Secondaries

The active clip carriages must enter the tenter frame at a known spacing and in synchronism with the EM wave in the first control zone, A (reference coil groups 930/930'). Prior to machine start-up the carriages are pressed up against one another with the carriage stops abutted and the lead active carriage held stationary at, say 921. This establishes the spacing at a known unvarying value at which the magnetic pole pitch of the carriage secondaries matches the EM wave pole pitch determined by the coils in the primary, such as first primaries 977/979 and 977'/979' comprising control zone A. A variety of means can be used to press the carriages together, such as linear motor means, conveyor belt means, gravity means, etc. In the preferred embodiment of the invention, linear hysteresis motor means on return sides 903/923 are employed. Since the preferred apparatus has two different polarity active carriages, as discussed earlier, the proper polarity active carriages must be located in both forward sides 910/912 at 921. For instance, if the starting EM wave requires a north magnet near the forward side of the carriage at 921 in the cartridge collection sensor of forward side 910, then a north magnet is also required near the forward side of the carriage at 921 in the carriage collection section of forward side 912. This special alignment is necessary whenever the magnet polarity on adjacent carriage secondaries is reversed as is preferred. Obviously, when alternate polarity carriages like these are used, there must always be an even number of carriages in each loop so this alternating polarity reversal is maintained as the carriages continuously circulate in the loops.

This preferred pre-start-up orientation of carriages can be achieved by manual positioning of the carriages or by proper operation of the linear motor control system by computer 1018. The sequence of steps utilizing the control system is as follows:

1. Beginning segments of the first primaries, such as in the transport section, are turned off; then computer 1018 causes second segments of the first primaries, such as in the drawing section, to be energized with the proper polarity DC current at a low value causing the coils of the three phases to develop stationary, alternated poles of an EM wave along the second segments.

2. Computer 1018 causes the remaining first primaries, the friction wheels and the second primaries to slowly propel all carriages out of the draw and stabilize sections and stack them on the return sides. The hysteresis linear motors on the return sides push the carriages through the transport section and into the draw section until the combined force of the stationary poles acting on several abutted carriages in the draw section is sufficient to overcome the pressing force of the hysteresis motors. The carriages along the second segments are held stationary, or fixedly engaged, by the EM wave.

3. Computer 1018 increases the current to the first primaries in the draw section to the normal operating level. There should be a brief delay while the carriages move back on the EM wave.

4. Computer 1018 causes the first primaries in the transport sections to be energized with the proper polarity DC current causing the coils to develop a stationary EM wave to engage the abutted carriages there to hold them stationary in phase, or "locked-up" on the EM wave.

5. Computer 1018 causes the primaries in the draw section to turn off;

6. Computer 1018 checks sensors at the end of the transport section at about position 921 to find out the type of active carriage there (north pole forward or south pole forward) in each forward side. The sensor can detect physical features provided on the carriages. If both carriages are the proper type go to step 9.

7. If the carriage at 921 on forward side 912 is incorrect, advance the phase polarity only on forward side 912 to step the carriages forward until the proper carriage is detected at 921 in forward side 912;

8. If the carriage at 921 on forward side 910 is incorrect, advance the phase polarity only on forward side 910 to step the carriages forward until the proper carriage is detected at 921 in forward side 910;

9. Computer 1018 causes the first primaries in the draw and stabilize sections, the friction wheels, and the second primaries on the return sides to slowly propel the unwanted carriages out of the forward side and into the stack on the return side;

10. The system is now initialized and the carriages can start running at the start-up speed at the desired start-up simultaneous stretch profile (it should be noted in some instances, the start-up stretch profile and the final stretch profile may differ as explained later);

11. After the carriages are running, the film can be threaded up at the tenter entrance in a conventional manner.

After this pre-start-up orientation of carriages is established, and the remainder of the forward sides of the loops are empty of carriages, the tenter frame can be started up and the carriages will be propelled one after the other along the forward sides in synchronism with the EM waves and returned along the return sides as shown in FIG. 10. This is similar to the operation of the single endless loop shown in FIG. 4 and this pre-start-up system is also useful for such a single loop. If the forward sides of the tenter frame are stopped in a controlled fashion, the relative positions of the carriages can be maintained and restarting does not require realigning of the carriages.

Primaries

Referring to FIGS. 10, 11 and 12, the first elongated primaries of the tenter frame loops are present in the carriage collection and operational sections of each loop. These first primaries, such as 985/985' comprised of upper primaries 985U/985'U and lower primaries 985L/985'L, interact electromagnetically with the upper and lower synchronous secondaries respectively on each active carriage. In FIG. 4, these first primaries correspond to the upper linear motor primaries 5. Second elongated primaries of the tenter frame loops are present in the stack forming sections of each loop. In view 13 of FIG. 11, the second primaries 943/943' are diagonally positioned to interact electromagnetically with the diagonally positioned hysteresis secondaries on the active and passive carriages. In FIG. 4, these second primaries correspond to the lower linear motor primaries 6. The arrangement of these tenter frame first and second primaries into control zones and the control of such control zones is similar to the arrangement and control of, respectively, the zones of the upper and lower primaries 5 and 6 discussed with reference to FIG. 4.

A typical primary structure is shown in FIGS. 2, 12, 13, 21 and 22, and in FIG. 2 of U.S. Pat. No. 4,675,582, and consist generally of coils placed in slots between laminated metal teeth. The predetermined alternating current to the primaries is supplied via conductors such as at 992 and 994. The use of both upper and lower primaries along selected portions of the forward side provides maximum thrust to an active carriage by simultaneous propelling of both of its synchronous secondaries 976 and 978. In some sections of the tenter frame where maximum thrust is not required, it may be convenient to omit one of the upper or lower primaries, for instance, the upper of the first primaries 977, 979, 981, 989, and 991. However, the upper and lower primaries also provide a balanced magnetic attraction force on the carriage so when one is omitted, the vertically disposed rollers on the carriage become more heavily loaded and the bearings must be sized accordingly. The primaries are positioned to be closely spaced from the carriage secondaries separated only by clearance gaps 996 and 998 in FIG. 12 and gap 1013 in FIG. 13.

In FIG. 12, forward side frame 962 also includes support plates for the upper and lower primaries 985'U and 985'L when both are present. These plates directly contact the back of the primary, and each have channels such as 1017 and 1019 for circulating cooling liquid to keep the operating temperature of the primaries down. Each primary, such as 985, has its core and end coils potted to provide mechanical protection to the coils and to conduct heat efficiently from the coils to the cooled support plates. Potting compounds such as filled epoxies, silicones, or ceramics are suitable as long as they have a temperature resistance and thermal conductivity compatible with the thermal loads imposed on the primaries. A preferred potting procedure is to surround all but one side of the motor with a steel frame, fill the motor with alumina oxide ceramic grit, and then apply a one part or two part epoxy so the percent fill by volume of the filler is about 80 percent. Such a technique is known for potting transformers. A two part epoxy having a bisphenol-A resin and nadic methyl anhydride (NMA) hardener has been successfully used. The frame preferably remains as an integral part of the motor. Heat in the primary comes primarily from $I^2R$ electrical losses and from heat absorbed from the film heating ovens. Strategically placed shields may provide some additional protection from radiant oven heat.

Wedges

Along the forward side of the tenter, there are several positions where a first primary begins or ends such as at 920 for the lower primaries, at 921 for the upper primaries, at 892 for the upper primaries, and 929 for the lower primaries. At these positions, a synchronous secondary goes from having air adjacent it to having the steel laminations of the primary core adjacent it. At these positions, it has been found beneficial to provide metal wedges such as those shown in representative loop 902 at 1060, 1062, 1064, and 1066. These wedges minimize the undersirable effects of a synchronous secondary magnet approaching the leading end and leaving the trailing end of a first primary. Such effects and details of the wedge construction and function are described in co-pending application, Ser. No. 209,909 filed June 22, 1982 now U.S. Pat. No. 4,922,142 filed concurrently herewith, which application is herein incorporated by reference. Along the return side of the tenter, there are several positions where there are gaps where a carriage has no controllable propulsion means acting on it. Referring to loop 902 in FIG. 10, such gaps occur between the exit of the friction wheel 995 and second primary 939 and at inflection points such as between second primaries 939 and 941, 941 and 943, 943 and 945, etc. At these gaps, it has been found beneficial to provide metal double-wedges such as those shown in representative loop 902 at 1068, 1070, 1072, 1074, and 1076. These double-wedges, such as 1072' in FIG. 13, are adjacent the lower synchronous secondary 978, and they act on the synchronous secondary to provide propulsion across the gaps at low speeds when carriage inertia may be insufficient to carry the carriage across the gaps. To minimize the induced magnetic resistance the double-wedge presents to the motion of the carriage at high speeds, the double-wedges are preferably constructed of thin sheets laminated together similar to the primary core. The operation and details of the double-wedge construction are also described in the above mentioned co-pending application.

Inflection Points

Referring to FIG. 10, there may be a number of inflection points in the loops where the track and the first primaries make an adjustable angular change from a straight path. These present a problem in maintaining precise control of carriage propulsion since the first primaries are interrupted at an inflection point. These occur, for example, at 921 between the transport and drawing sections and at 924 between the drawing and stabilizing sections on the forward sides of the loops. There may also be inflection points at other forward side locations where the tracks are moved to accommodate angle changes when the tenter frame is adjusted to fine tune TD draw ratios. Inflection points in the tracks also occur at corresponding positions on the return sides, but since the degree of control of carriage motion is less precise on the return sides there is no problem presented there. FIGS. 21 and 22 show enlarged views of an inflection point such as at 921 in forward side 910. At the inflection point it has been found most convenient to omit the primary coils so flexing can freely occur and the wires in the coils are not subjected to repeated bending that eventually causes fatigue and breakage. Omission of the coils also makes it possible to remove sections of primary for maintenance and repair without disturbing the remainder of the primary. The loss of electromagnetic force at an inflection point with omitted coils can be minimized by taking the following steps:

- eliminating one phase-set of coils at the inflection point;
- powering the coils on either side of the inflection point with the same power waveform;
- providing overlapping back-iron at the inflection point.

A significant aspect of the second step is that a control zone boundary will never occur at an inflection point since both sides of the inflection point are powered by the same waveform, i.e. one from a single control zone.

FIG. 22 shows a section view of the inflection point of FIG. 21. Each primary consist of thin steel laminations, 1015, glued and bolted together to form alternating slots, such as 1020, and teeth, such as 1022, and black iron, 1024. Coils of wire, such as 1026, are placed in the slots as shown. In this example where three phase AC power is used to energize the coils, adjacent coils are A, C, and B phases making up one phase-set of coils. Primary 981' can pivot clockwise or counterclockwise with respect to primary 983' about pivot center 1028. The ends of each primary at the inflection point are equally chamfered at 1030, 1032, 1034, and 1036 to provide clearance during pivoting.

Primary 981' has the teeth and part of the back-iron cut off at 1038. Primary 983' has some of its back-iron removed at 1040. The back iron of primary 983' at 1040 can therefore overlap the back-iron of primary 981' at 1038 as shown. The back iron ends at 1042 and 1044 are chamfered, as the ends of the primary were, to provide clearance during pivoting. There is a small clearance gap 1058 between the overlapped sections of back-iron so they can pivot freely without binding when the primaries are mounted on support plates 1046 and 1048. The support plates also have chamfers for clearance during pivoting.

At the inflection point, three adjacent coils have been removed (shown in phantom in FIG. 22) from the normal three phase progression of coils had there been no inflection point. That is, an A, C and B phase coil are missing at the inflection point, i.e. one phase-set of coils. It should be noted that the break or joint between primaries at the inflection point occurs at a slot and not at a tooth. The tooth preferably remains intact since it is an important element in the flux path to the secondary. To minimize the distortion in the EM waveform, the current in the same coils on either side of the inflection point must have the same frequency, phase, and amplitude. This will produce the proper "consequent pole" at these teeth. To insure this condition, the coils on both sides of the inflection point are preferably powered by the same source of three phase AC; this is, they are part of the same control zone. For instance, all the coils in the segment of primary 981' shown to the left of the pivot in FIG. 22, and the A coil at 1045, the C coil at 1047, and the B coil at 1049 to the right of the pivot would be in the same control zone. This eliminates possibilities of phase shifts that might occur if each section of primary on either side of the inflection point were driven by their own separate three phase power sources. This clarifies the earlier discussion of why the group of coils 930 making up representative control zone A are from two mechanically separable first primaries, 977 and 979 that meet at an inflection point.

Friction Wheel

Figure 17:
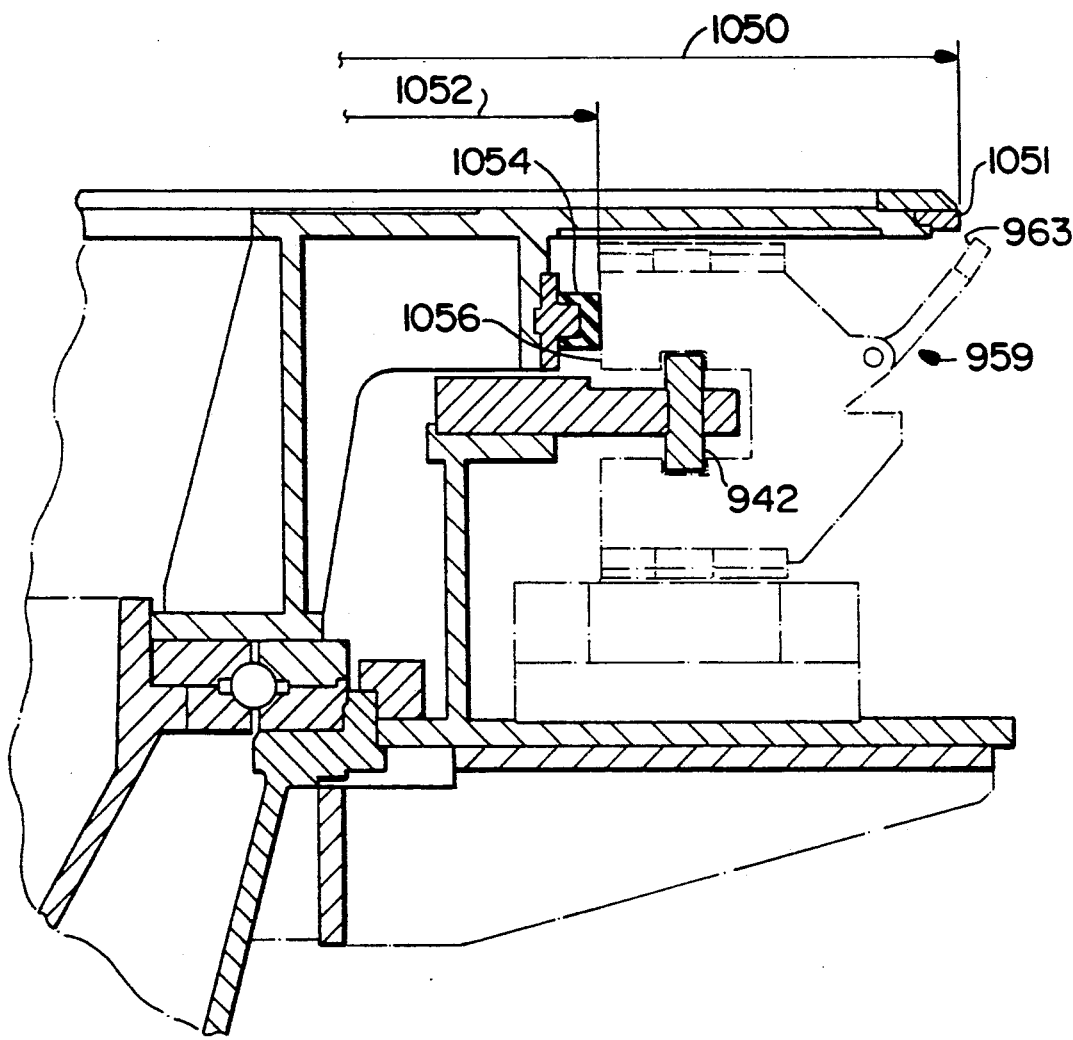
FIG. 17 is a cross-section of the friction wheel engaging the carriages at the end of the film processing section taken along line 17—17 in FIG. 10.

FIG. 17 shows a typical section through exit friction wheel 995 such as at 17—17 in FIG. 10. The rotating wheel has an upper level diameter 1050 that serves to contact the cam following surface 963 on approaching tenter clip 959 to force it open (as shown) as the active and passive carriages pass under the wheel. This releases the film from the clip. A lower level diameter 1052 consists of an elastomeric ring 1954 that forcibly engages a back surface 1056 on both active and passive carriages. The carriage track 942 has the same center of radius as the wheel and holds the carriage against ring 1054 as the friction wheel and carriage travel together in non-slipping engagement for about 180 degrees of rotation of the wheel. After about 180 degrees of rotation, the guide track 942 straightens out and guides the carriages away from the friction wheel. Both friction wheels 993 and 995 are driven, via mechanical gearing, by a single rotary motor 103 whose speed is regulated by computer 1018 to operate in a predetermined manner to rotate the friction wheels so that the surface speed of lower diameter 1052 closely matches the predetermined linear speed of the carriages as they exit the tenter forward side. Since the engagement between diameter 1052 and the carriages is frictional and not fixed, as by teeth on a gear or sprocket, an exact speed match and position match are not required and any spacing of carriages can be accommodated. This is an improvement over other known simultaneous biaxial film stretchers, powered by linear motors or other means, where the carriage spacing and, therefore, the longitudinal draw ratio, is fixed by a particular exit sprocket.

Control Zones

Figure 18:
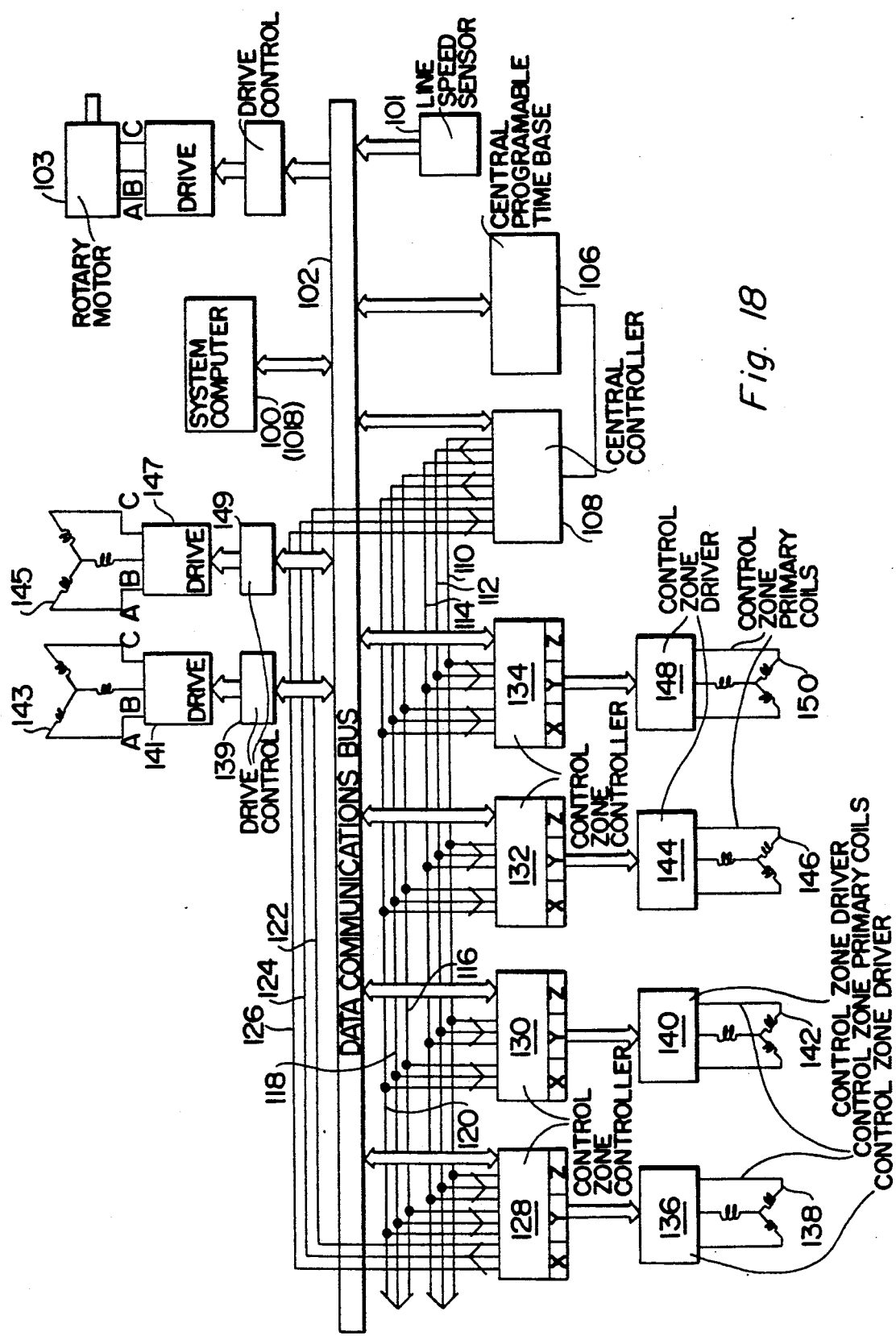
FIG. 18 is block diagram of a representative portion of the control system of the invention and is based on FIG. 1 from U.S. Pat. No. 4,675,582.

FIG. 18 shows an exemplary diagram of the overall control system of the invention which is based on the the control system of U.S. Pat. No. 4,675,582. System computer 100, corresponding to system computer 1018 in FIG. 10, communicates with all of the first primary drivers and second primary drives and the friction wheel drive via communication bus 102. Sensor 101 feeds information to the computer about the speed of the film entering the tenter so the tenter can be coordinated with the preceding part of the film line.

Along the forward sides of the tenter frame in the carriage collection and operational sections, each first primary includes a plurality of groups of coils with the groups of coils in one primary in one loop sized to match the groups of coils in the other primary in the opposed loop and with each of the opposed groups of coils being electrically joined and defining a single control zone. Such control zones are independently controlled and the groups of coils therein all receive matching or the same driver instructions simultaneously. In the previous discussion of the linear synchronous motor system of FIG. 4 for the upper primary, a zone consisted of only a single group of coil windings which required a zone driver and a zone controller of independent control of that single group of coil windings. A control zone as discussed in describing the tenter frame consists of opposed groups of coil windings.

A control zone for the first primaries of both loops may consist of four groups of primary coils in the areas of the tenter where high drawing forces are required. Referring to control zone C comprising groups of coils 934/934' (FIG. 10), it consists of a first group of upper coils 934'U and a second group of lower coils 934'L in operational side 910, and a third group of upper coils 934U and a fourth group of lower coils 934L in operational side 912. Referring to FIG. 11, these groups of coils are part of upper first primaries 985U/985'U and lower first primaries 985L/985'L. The groups of coils in control zone C are electrically joined to control zone driver means 1000. This driver means may consist of a single zone driver such as 136 shown schematically in FIG. 18 and in detail in FIG. 20 or two zone drivers, one for the upper and lower coil groups in each forward side, or four zone drivers, one of each group of coils in the control zone. The choice of how many zone drivers to use depends on the power match between the power requirements of each group of coils versus the power rating of a zone driver. The groups of coils may be electrically connected to the control zone driver or drivers in series, parallel, or series/parallel which also depends on the above power match. What is important is that a control zone controller means such as 1002 for control zone C be common for all the control zone drivers for that zone. This control zone controller means may be a single control zone controller as at 128 in FIG. 18, or, for controller capacity reasons, it may be two or more control zone controllers that have identical control instructions stored in each. When, in a preferred embodiment, control zone driver means 1000 consists of a single control zone driver, and zone controller means 1002 consists of a single control zone controller, and the coils such as 138 in FIG. 18 represents all four groups of coils in the tenter frame control zone, then FIG. 18 depicts a representative portion of the control system for the linear motor tenter frame.

It is also contemplated that several control zones can be utilized to propel the carriages the same where the instructions for those control zones are all the same. For instance, in the transport section where the carriages are traveling abutted at the same speed, there can be several control zones, such as control zone A, powered by separate control zone drivers and zone controllers. These zone controllers, however, would all provide the same instructions simultaneously to the control zone drivers when those control zones are all operated to propel the carriages the same. For special situations, such as carriage initialization, the individual control zones can also be operated independently.

Just as representative control zone C is connected to a zone driver means and zone controller means, so are representative control zones such as A and B connected respectively to zone drivers 1004/1006, and 1008; and zone controllers 1010/1012, and 1014. Similarly to FIG. 18, all the zone controllers are connected to a central controller 1016 which corresponds to central controller 108 and central programmable time base 106 in FIG. 18. The central controller and zone controllers are also in communication with system computer 1018, corresponding to system computer 100 in FIG. 18, which for clarity in FIG. 10 is shown only in communication with central controller 1016.

The control zone for the second primaries are similar, but not identical to the control zones for the first primaries. A control zone D for the second primaries, such as primaries 943/943', preferably consists of two groups of coils, such as 890 in the return side of loop 902 and 890' in the return side of loop 900. These two groups of coils would receive identical control instructions. The groups of coils may be connected to a single drive and drive control or each may have a separate drive and drive control with the two drives and drive controls receiving identical control instructions. As shown in FIG. 10, coils 890 would be powered by drive 1078 and drive control 1086, and coil group 890' would be powered by drive 1080 and drive control 1088; both drives receiving identical control instructions from computer 1018. Similarly, coil groups 894 and 894' would be connected to drives and drive controls 1082, 1090 and 1084, 1092 respectively and would make up control zone E.

The above arrangement is reflected in the schematic of FIG. 18 which shows how two typical second primary zone coils 143 and 145 are connected to drives and drive controls 141, 139 and 147, 149 respectively for communication with system computer 100, corresponding to computer 1018 of FIG. 10. Since the second primary control zones are operated at a constant frequency and there can be many carriages in a zone at a time, the control requirements are much more simple that the first primary control requirements. Therefore, there is no need for a central controller to precisely coordinate the instructions to the multiple control zones of the second primaries. The control zones of the second primaries do, however, still cause the carriages to move in approximate symmetry from one loop to the next, but exact symmetry of motion of pairs of carriages will normally not take place nor it is required.

On-line changes to the instructions for the second primaries to accommodate changes in the line speed, or changes in the MD draw ratio, of the tenter can be accommodated by updating the instructions at fixed intervals by computer 1018. This updating would occur during the instruction changes taking place for the first primaries in a transition operation. This updating was previously discussed when referring to the single loop linear motor control system. A suitable update interval in the tenter, where the film will only tolerate gradual changes, if from about $\frac{1}{2}$ second to about 10 seconds, depending on operating speeds. Between modest operating condition changes for the first and second primaries, the system should be allowed to operate steady-state for a period to stabilize the system before making further changes. When updating the instructions for the second primaries, all instructions can be changed simultaneously without significant upset to the carriages already in the return side, or just entering it, due to the inherent stability of the linear hysteresis motor system.

Zone Drivers

It is important that sufficient current be present in each control zone to propel the carriages around the loops. A zone driver utilizing voltage control suitable for this purpose is described in our previously mentioned. U.S. Pat. No. 4,675,582.

While this driver is very effective in propelling the carriages, it has been found that a driver utilizing current control can also be used to assure that there is always adequate current in the zones. The driver of FIG. 8 in the '582 patent can be appropriately modified for this purpose. Such improved driver, which is shown in schematic form in FIG. 20, provides rapid response constant current control for this system. A similar type rotary motor driver, with the addition of a flux responsive circuit not needed by the invention, is also described in U.S. Pat. No. 4,259,620, which is hereby incorporated herein by reference.

The problem the modified driver solves is the following. When a pair of synchronous secondaries propelled in the dual loops of the tenter enter an empty (no secondaries present over the coils) control zone, two things happen to vary the current. One, it is believed a back-emf is induced in the coils of that control zone and two, the inductance of the zone is increased by the presence of the secondary over the coils. These effects cause a sudden momentary drop in the current flowing in the coils of that control zone and consequently reduces the electromagnetic force engaging the secondaries. This problem is more pronounced at high secondary (carriage) speeds and in a small control zone that has a small lambda length compared to the lambda length of the secondary. It is also more pronounced in more powerful synchronous motors with a high inductive coupling between the secondaries and primary. Rapid changes in current when a secondary enters a control zone effectively imparts a momentary force pulse to the carriage thereby causing oscillations. In extreme cases the oscillation may cause the secondaries to lose synchronism with the EM wave of the control zone and therefore stop the carriages. This problem can be overcome by providing a rapid response current control system to react to the back-emf and inductance change rapidly, and compensate by increasing the available power to the coils.

Rapid response current control can be accomplished by the following:
  providing a high available voltage to the driver switching transistors;
  sensing a current indicative of the current output by the transistors and determining the difference between the sensed current and a desired current level, and;
  interrupting, based on the difference, the instructions for turning the transistors "on" to thereby regulate the current output of the driver to maintain the coil currents at the desired level. Additionally, the following step can be included:
  limiting the interrupting to a rate which is less than the switching limit of the transistors to thereby avoid transistor overheating.

FIG. 20 shows an improved zone driver similar to the driver shown in FIG. 8 of U.S. Pat. No. 4,675,582. The voltage control circuitry that provided a reduced voltage on second bus 531 (FIG. 8, '582) has been omitted, so now there is only a single high voltage bus 529. Current sensors 550, 552 and 554 have been added to sense currents directly in phase coils A, B and C respectively. Output from the sensors is directed to a new zone driver current control and gating logic 556 that replaces zone driver gating logic 520 in FIG. 8 ('582). Output protection is still provided from 508 on line 510. The voltage setpoint and frequency to voltage converter of FIG. 8 ('582) is shown in FIG. 20 operatively separated from 508 and is now used to set the current control setpoint on line 558 to new circuit 556.

FIG. 23 shows the zone driver current control and gating logic 556. On the right side of the figure is shown the inputs from the A, B and C phase current sensors. At the bottom of the figure are the 3 bits of control information for the A, B and C phases input from the zone controller along logic line 500. At the left of the figure is the input for the current setpoint for all three phases on line 558 and the output protection control on line 510. The output protection is present to prevent damaging current conditions that might develop from failed drive components and is not the subject of this invention, so its operation is omitted for clarity. At the top of the figure, the output lines from the circuit 556 are shown for the upper and lower transistors for each phase designated A, $\bar{A}$ and B, $\bar{B}$ and C, $\bar{C}$. The current control of the invention is accomplished along these phase control lines as will be explained.

All three phase currents are sensed and controlled independently, so the explanation for one phase will apply to the other two as well. The A phase current control is shown on the left side of FIG. 23. The phase control information for phase A is fed in on line 506 and provides one input to the base of AND gate 560 on line 562. It also is inverted by inverter 564 on line 566 and provides one input to the base of AND gate 568. The information on these lines 562 and 566 provides the desired, predetermined switching pattern for the upper and lower A phase power transistors 530 and 532 (FIG. 20) respectively. Likewise, the information on lines 570 and 572 provides the predetermined switching pattern for the phase transistors and the information on lines 574 and 576 provides the predetermined switching for the C phase transistors. Depending on the actual current level in the phase, however, this predetermined switching pattern may be interrupted by the current control circuit that provides the other input to the bases of the AND gates 560, 568, 578, 580, 582, and 584.

The current control circuit will now be explained, once again referring to the A phase, but it applies to all three. The desired current level reference signal is applied on line 558 as one input to the base of the A phase comparator 586. Within the comparator is circuitry for deadband limits for the reference current.

The comparator determines the difference between the sensed current and the desired reference current deadband. If the sensed current is less than the lower deadband limit of the reference, the output of the comparator is low; if the sensed current is greater that the upper deadband limit of the reference, the comparator output is high. If the sensed current is within the deadband limits, the last output from the comparator continues. The comparator output is one of the inputs on line 590 to the two logic gates 586 and 588 of the A phase current control rate limiting circuit 598.

Since a high voltage is always present on bus 529 to provide the desired current, yet a high voltage is only occasionally required, the current signal is frequently above limits. Therefore, the current control circuit is frequently turning the power transistors off and on to try to keep the current within the deadband limits. To protect the power transistors from excessive switching rates that are normally determined by the L/R time constant for the phase coils, a switching rate limit is incorporated into the current control circuit. Excessive switching rates cause overheating when added to the normal transistor heat load and must therefore be avoided.

The current signal to logic gate 588 is compared to the last signal received which is present on line 592. This OR gate comparison feeds a non-retriggerable logic circuit, 594. When the inputs are different, as they would be for example if the current is "on" to a transistor and the level goes above the upper deadband limit, the chip logic feeds a signal out to line 596 subject to a timing circuit represented by RC elements shown. The logic circuit 594 prevents the timer from starting over again due to a state change until it has completely timed out. This timing circuit 598 limits the switching rate that the current control circuit can implement to thereby protect the power transistors from excessive switching at high currents. The output from NOR gate 586 is inverted and becomes the other input to the base of AND gates 560 and 568. A typical IC chip 594 useful for this circuit is a Motorola non-retriggerable "one shot" chip, part no. MC145388 from Motorola Inc., Austin, Tex. As mentioned, the current control circuit switching rate natually seeks a level determined by the L/R time constant which varies the magnitude of the current, but this has been limited by the rate limiting circuit provided. The result of this is shown in FIG. 24 where a typical time slot of current applied to an inductive load is seen. A voltage bus powering the typical induction load is sufficient to drive a current through the load that exceeds the desired current. For different operating conditions, such as for start-up and for high speed continuous operation, the current level may be set low or high or somewhere in between. For a low and a high current, the current builds up and decays in about four time constants. However, for the high current the curve at initial turn-on and turn-off is much steeper than for the low current since the high current must rise to and fall from a higher level in the same time as the low current. Rise and fall of the high current within its deadband will be much faster that the low current for the same deadband. Therefore, the number of switchings naturally occurring per unit time will be greater for the high current. When the same deadband limits are applied to both current levels, the results are shown for the low current at 543 and for the high current at 545. As can be seen, the natural on-off rate for the high current is much more frequent than for the low current. The low current rate may be acceptable, but the high current rate will cause excessive heating in the power transistors. When the rate limit logic of the current control circuit is applied, the high current trace will resemble the dashed trace at 547.

In operation, when the instructions on line 506 call for the current in the A phase to be "on", the current rises due to the excess voltage on bus 529 until it exceeds the upper deadband limit, such as at 549, at which time the comparator output goes high on line 590 to rate limiting circuit 598. If the time since the last comparator state has expired, the rate limiting circuit outputs a signal to the AND gates 560 and 568 that interrupts the "on" instruction for the A phase current and the rate limiting circuit 598 starts timing this new state. The current in the A phase coils then starts to decay and drops down to the lower deadband at which time the comparator output goes low. If the rate limiting time has expired, the "on" instructions for current can be un-interrupted and current to the coils will be turned on. If the rate limiting time has not expired, the "on" instructions are still interrupted and the current continues decaying until the time has expired. In this latter case, the current trace resembles the dashed lines that rise above and below the deadband limits.

Referring to the dashed line trace, the rate has been limited to an acceptable level now, but the current swing is somewhat greater that the original deadband limits. In effect, the narrow deadband limits for the high current level where the rate limit logic was utilized have been broadened to control the excessive switching rate, thereby preventing overheating of the power transistors. If low currents are selected for the drive, the narrow deadband limits may be the controlling factor in determining the switching rate thereby allowing rapid response even at low currents. This methods of establishing rate limiting is preferred to fixed deadband limits that must be readjusted for different current levels to be effective in limiting high currents without the same deadband limits slowing the current response at low limits. This method of limiting allows the drive to provide maximum current response whatever current level is selected for a particular set of operating conditions.

The preferred circuits shown have been for providing rapid response current control in a transistorized inverter type drive having predetermined, remote source, phase control instructions. However, other means may be used within the scope of the invention for providing an excessive voltage bus and limiting the current by interrupting the predetermined instructions at a controlled rate. A simplification of the circuit explained which employs only a single current sensor on the positive DC bus, and omits the "AND" gates on the $\overline{A}$, $\overline{B}$, and $\overline{C}$ switching lines to the transistors (much like the circuit in the '620 patent) would also accomplish the same control. With an effective rapid response current control circuit, the current to the coils of a control zone can be rapidly controlled to keep the current at the desired level thus avoiding sometimes undesirable oscillations in the motion of the active carriages.

The linear motor zone drivers in the tenter frame control system can all be the same for the convenience of maintenance and parts inventory, but they can be different for the first and second primaries. For the second primaries where phase and frequency matching between control zones is not required, the drive powering a control zone can be a conventional inverter-type adjustable frequency drive, with some form of current control. The conventional gating logic would include the means for switching the transistors in a conventional manner. For the first primaries, however, the control zone controller with specialized instructions for switching the transistors will always be required.

Zone Controllers

The control zone controllers in the tenter frame control system for the first primaries are all structured according to the zone controllers of FIG. 5 of the '582 patent, previously incorporated by reference. These control zone controllers include a first steady state memory such as 404 to operate a control zone at a first steady state operating condition; a second steady state memory such as 412 to operate the control zone at a second steady state operating condition; and a third transition memory such as 408 to operate the control zone to achieve a transition from the first steady state to the second steady state operating condition. In the tenter frame, this ability to change from one steady state operating condition to another permits the tenter frame to change the MD draw ratio from one continuous operating draw ratio to another while continuing to draw the web of material without stopping.

Variable Draw Ratios

This particular feature, i.e., to be able to readily change operating states, i.e., draw ratios, for the control zones without stopping the propulsion of the tenter clip carriages through the control zones, provides unique capabilities to the tenter frame of the invention. First, it allows the tenter frame to be started up, and the film first threaded through, at a low first steady state simultaneous biaxial draw ratio and then, while continuously drawing the film, change to a higher steady state simultaneous biaxial draw ratio. Second, it permits fine tuning the simultaneous biaxial draw ratio during operation to optimize the process and achieve film quality not possible before since prior art simultaneous biaxial tenter frames can only make incremental MD draw ratio changes by lengthy and costly shut downs and start-ups of the line.

TD drawing of the film can also be adjusted and fine tuned during operation by intermittently driving adjusting screws, such as 907, which move the loops toward and away from each other. The tracks flex and slide at the loop inflection points to accommodate the angle changes. Such lateral adjustment features are shown in U.S. Pat. No. 3,150,433, which is hereby incorporated herein by reference. The screws and pivotly mounted nuts for adjusting the tenter frame width have a right hand threaded screw segment, such as 911, and nuts, such as 913 and 915, for one of the loops and a left hand threaded screw segment, such as 917, and nuts, such as 919 and 909, for the other loop. In this way rotation of an axially fixed screw, such as 907, moves the two loops in opposite directions toward and away from each other. A motor, such as 905, attached to the screws and controlled by the operator accomplishes rotation of the screws prior to and during tenter frame operation. When desirable, then, both MD and TD draw ratios can be varied while continuing to simultaneously biaxially draw the web.

At low MD and TD draw ratios it is relatively easy to thread up the film whereas at high draw ratios it is common to experience film tearing and breakage with numerous film polymers, such as polyethylene terephthalate films.

After the film is running at the low MD and TD draw ratio, it is possible with the apparatus of the invention to increase the TD draw by adjusting the tenter frame width and increase the MD draw by switching control of the tenter clips to a third transition operating condition where the MD draw ratio is continuously changing until it reaches a second steady state MD draw ratio. Then the control system can switch control of the tenter clips to the second steady state MD draw ratio of operate continuously. This permits running at a high simultaneous biaxial MD draw ratio which was not possible in prior art tenter frames because they operate at only one fixed simultaneous biaxial MD draw ratio which cannot be threaded up when it is a high draw ratio. High simultaneous biaxial MD draw ratios are those that exceed 3X, or preferably 5X, or more preferably 7X, and most preferably 9X. This results in a simultaneously biaxially drawn film that was not possible to make continuously in a single stage draw before. By single stage is meant within a single draw section of a tenter frame.

Sequential Drawing

From the above it will be seen that in accordance with the present invention longitudinal drawing of a film may be precisely regulated due to the use of a plurality of linear motor powered carriage pairs individually controlled independent of other pairs with respect to longitudinal movement thereof. Thus, biaxial drawing of the film may be accomplished simultaneously as described or it may be accomplished sequentially as well. In sequential drawing lateral drawing precedes longitudinal drawing or vice versa. If it is desired to laterally draw the film prior to longitudinal drawing, the speed of the carriages in the diverging portions of the guide tracks is maintained constant such that only lateral drawing is accomplished and thereafter in the stabilization section the speed of the carriages is progressively increased to longitudinally draw the film. If this mode of operation is desired the size of some of the groups of coils as shown in the control zones of the stabilization section of FIG. 10 would have to be redesigned so when the carriages are to be spaced apart, there is never more than one pair of carriages at a time in a control zone. In order to longitudinally draw the film prior to lateral drawing, the guide tracks in the drawing section are readjusted to continue parallel and the speed of the carriages is progressively increased in the parallel part of the drawing section to provide longitudinal drawing, and thereafter the speed of the carriages remains constant as the track diverges in the stabilizing section to achieve only lateral drawing. Furthermore, if only longitudinal drawing is required with no lateral drawing, the guide tracks from 921 to 929 may be maintained parallel thereby not providing any lateral drawing of the film. Also, if only lateral drawing is required with no longitudinal drawing, the tracks would diverge as in FIG. 10, but the carriages would all travel at a constant speed without being spaced apart throughout the entire forward sides of the tenter frame. As long as all active carriages are traveling abutted at the same speed there can be more than one carriage at a time int he operational section control zones.

MD Simultaneous Stretching Variations

The advantages obtained by the present invention stem substantially from the elongated stationary primaries divided into control zones which control zones operate on moving pairs of synchronous secondaries of linear motors to impart predetermined speeds to active carriages carrying the secondaries and tenter clips along the primaries. Thus, since each pair of active carriages is independently propelled (that is, precisely movable independent of the other carriage pairs) an acceleration program may be determined for superposing on the lateral drawing a predetermined, controlled, longitudinal drawing. Accordingly, the longitudinal displacement applied to the film during its movement through the drawing section may be precisely regulated at all times; and, similarly, the speed of the film in the transport and stabilizing sections may be precisely controlled. Wherever the active carriages are to be separated, the control zone lengths are selected so there is never more than one active carriage at a time in a group of coils in a primary of a control zone. Then, by predetermining the frequency and phase supplied to each primary control zone, any desired drawing of the film can be achieved, such as varying the MD draw rate and the ratio of amount and rate of MD to TD draw within the drawing section. For instance, the MD strain rate during simultaneous biaxial stretching of the film can be controlled at various positions in the drawing section of the tenter frame. The strain rate is defined as the following:

The strain rate, or instantaneous strain rate, occurring between two adjacent clips at two different times during stretching is defined by the following:

$$\text{strain rate } (SR) = \left( \frac{L2}{L0} - \frac{L1}{L0} \right) \times 100\%/(t2 - t1)$$

$SR$ = % Strain per Minute where:
  $L0$ = length of unstretched film between two adjacent clips at time = $t0$ = 0, at the beginning of stretch.
  $L1$ = length of stretched film between two adjacent clips at time = $t1$.
  $L2$ = length of stretched film between two adjacent clips at time = $t2$.

The average strain rate (ASR) is a special case of the strain rate where the stretch is measured from an unstretched condition at $t0$ to a fully stretched condition at $t2$. In this case, $L1 = L0$; $t1 = t0$; and $t2 - t0$ = total stretching time. This results in the following:

$$\text{average strain rate } (ASR) = \left(\frac{L2}{L0} - \frac{L0}{L0}\right) \times 100\%/(t2 - t0)$$

$$ASR = \left(\frac{L2}{L0} - 1\right) \times 100\%/\text{time to stretch}$$

The strain rate can be controlled to be a constant value throughout MD simultaneous stretching, or it can progressively increase during MD simultaneous stretching, or it can rapidly increase and then progressively decrease during simultaneous stretching. Compared to commercially known tenter frames the tenter frame of the invention can produce strain rates two to three times greater. This is because for any given MD drawing distance and strain rate control, the tenter frame of the invention can run at operational speeds two to three and sometimes ten times greater than any prior art tenter frame for simultaneous biaxial stretching. For instance, commercial versions of the tenter frame of previously mentioned U.S. Pat. No. 3,150,433 can only achieve continuous operating film exit speeds of less than about 500 feet per minute. The tenter frame of the invention can achieve operating film exit speeds of about 1200 feet per minute. When drawing a film at that exit speed and a 5X MD simultaneous biaxial draw ratio in about a nine foot distance at a constant MD strain rate, the result is an MD strain rate of about 32,000% per minute.

In order to more fully appreciate the merits of the invention, polymeric films were biaxially drawn simultaneously in the MD and TD directions on the linear synchronous motor tenter frame of the invention using varying speeds, various draw ratios, etc. Although, in prior art machines, biaxially drawing film simultaneously in both directions has been achieved, not until the drawing of film on the described apparatus will one be able to readily vary the absolutely simultaneous biaxial draw ratio to obtain the outstanding properties of the films of the present invention - films that are biaxially drawn absolutely simultaneously in both directions without prestretching in the machine direction, or biaxially drawn in a precisely predetermined controlled manner.

Thus, films can be drawn at least 3X in both directions at strain rates of from 10,000%/minute to strain rates as high as 60,000%/minute. Preferred films can be drawn at least 5X; the most preferred films can be drawn at least 7X and most preferred can be drawn at least 9X. The films can be any of the following materials: polyesters, e.g., polyethylene terephthalate and polybutylene terephthalate, polyamides, polyacrylates, polyolefins, e.g., low and high density polyethylene, polypropylene, etc., propylene-ethylene copolymers, polycarbonates, polyvinyl chloride, polystyrene, polyurethanes, polyvinyl alcohol, polyvinylfluoride, polyacrylonitrile, polyimides, copolymers of ethylene and vinyl alcohol, polyphenylene sulfides, copolymers of vinylidene chloride and vinyl chloride and copolymers of ethylene with olefinically unsaturated monomers such as vinyl acetate, methyl methacrylate, ethyl methacrylate, ethyl acrylate, methyl acrylate, acrylonitrile, methacrylic acid or acrylic acid and ionomers thereof.

Biaxially oriented polyethylene terphthalate film prepared by the process of this invention is particularly preferred herein and may possess many unexpectedly good characteristics such as high mechanical strength, very low heat shrinkage, and excellent dimensional stability that will make it an outstanding candidate for use as a base film in magnetic recording tapes and disks, capacitors, etc. This should be particularly true for those films biaxially drawn as high as 5X or 7X.

In drawing a web of film with the tenter of the invention, it has been discovered that the tenter, with active and passive carriages propelled at draw ratios exceeding about 3X and exit speeds exceeding about 200 feet per minute, leaves a characteristic mark on the improved film made by the tenter. This mark is evident on the thickened film edge bead as it leaves the tenter and is thought to be unique to this film product only first produced by the process of the invention. The active clips leave a stress pattern in the bead that is angled from the central portion of the web toward the edge in a direction that is toward the direction that the web was longitudinally drawn. The passive clips leave a stress pattern in the bead that is angled in a direction opposite the direction the film was drawn.

In FIG. 15, the general direction of the stress pattern mark left by the active clip is represented by arrows 988, which are angled toward the direction the film was drawn represented by arrow 955. The general direction of the stress pattern mark left by the passive clip is represented by arrows 990, which are angled in a direction opposite arrow 955.

Tenter Loop Operation

FIG. 19 shows three predicted plots of clip carriage velocity versus position for a simplified loop that simulates the tenter loop of the invention. To simplify analysis of the system, the number and length of the control zones is reduced and gaps between return side control zones are omitted; the stabilization section of the tenter is eliminated. The purpose of the three plots is to show how three different film stretch profiles can be accommodated by the system of active and passive carriage propulsion and in particular how the different profiles affect the return side active and passive carriage deceleration and the carriage stack. In FIG. 19, the dashed plot designates the EM wave speed for each plot of carriage speed. Numerals 1, 2, or 3 indicate which curve the EM wave speed is associated with. Curve 260 is associated with numeral 3; curve 262 is associated with 2; curve 264 with 1. Plot 260 shows the tenter operating with a longitudinal draw ratio of (33.3 lambda per sec)/(11.1 lambda per sec) or 3.0x; plot 262 a ratio of 44.4/11.1 or 4.0x; plot 264 a ratio of 88.8/22.2 or 4.0x. FIG. 25 is a diagram of one representative loop of the simplified tenter that is keyed to the plots to show the representative relationships between carriage speed and carriage position in the simplified tenter loop.

Certain portions of the speed versus position plot are predetermined by the desired operating conditions for stretching the film. For instance, referring to curve 260, the entrance speed of the clips from 266 and 268 which is also the stack speed is determined by the film speed; and the acceleration, final draw ratio, and exit speed of the clips, from 268 to 270 is also dependent on film stretching requirements. These parts of the plots may take many values and forms not determined by the linear motor system so they will not be discussed here. Referring to FIG. 25, the zero position at the left of the loop at location "a" corresponds to the zero position on the horizontal axis of the plot in FIG. 19. From "a" to "b" is the forward side; from "b" to "c" to "d" to "e" to "f" to "a" is the return side. The first primaries extend from location "a" to "b" and propel the active carriages. The passive carriages are propelled from "a" to "b" by abutment with the active carriages or engagement with the film, carried by the active carriages. The film is gripped at "a" and released at "b". From "b" to "c", the friction wheel propels both active and passive carriages. The second primaries extend from "c" to "d", and propel the active and passive carriages. From "d" to "e", there are neither first nor second primaries; both active and passive carriages are abutted here and preceding "d" and are pushed by the preceding second primaries. From "e" to "f", is a segment of first primary that propels the active carriages; the passive carriages are pushed by the active ones. From "f" to "a", there are neither first nor second primaries; both types of carriages are pushed through this segment.

On cure 260, the carriages enter the tenter in an abutted stack at 266. At 268 is the stack exit where the carriages begin accelerating and separating until they reach a final speed (33.3 lambda/sec) and spacing at 270. Shown is a drawn ratio of 3x. At 270 the carriages are propelled at a constant speed by the friction wheel before entering a second primary, hysteresis zone at 271. At the relatively low draw ratio of 3x, a large number of carriages are on the forward side so the return side speed must remain high to rapidly get the remaining carriages back to the stack entrance. Therefore, in control zone 276 the speed of the EM wave is such as to continue propelling the carriage at 33.3 lambda/sec. In control zone 278 this EM wave speed is retained. In control zone 280 deceleration of the carriages is begun by decreasing the EM wave speed to about 26 lambda/sec. The speed of idler and powered carriages drops to about 24 lambda/sec before the end of control zone 280. So, regardless of slight variations in the rate of deceleration, all carriages reach about the same speed before leaving control zone 280 and the carriages enter the next zone traveling at this predictable speed. Therefore, the conditions under which carriages enter any hysteresis control zone are a known constant, and slight variations in speed are not additive from one control zone to the next. In control zone 282, the carriages again decelerate upon entering the control zone and reach an equilibrium speed where control zone 282 is applying thrust to overcome carriage friction before the carriages reach the entrance end of the stack at 288. It is important that the entrance part of the stack always occurs before the carriages leave the second primary. The actual stack entrance end may occur at a gap between hysteresis control zones or within one. The last hysteresis control zone is preferably always filled with carriages so sufficient stack force is developed to compress the carriage bumpers and therefore get the carriages on the proper pitch to match the EM wave in the beginning of the first primary control zone 261 at 266.

In some cases it may be desirable to place a short synchronous control zone at 286 in FIGS. 19 and 25. This corresponds to first primary 975 in FIG. 10. This provides a force assistance to the first few carriages in control zone 261 which are those putting the first tension on the film at the tenter entrance. Control zone 261 corresponds to control zone A (coils 930/930') in FIG. 10. The two synchronous secondaries on each active carriage engaged in control zone 286 produce considerably more force in a compact space than the single hysteresis secondaries on the active and passive carriages in control zone 282. This force assistance is preferred since any force displacement of the first active carriages in the transport section 918 (FIG. 10) to maintain tension in the incoming film, may result in slight stretching here which is undesirable.

Curve 262 shows the effect of a higher draw ratio, 4x versus 3x, on the return side. In this case, more active and passive carriages are shifted to the return side so their energy is removed over a shorter distance to accommodate a longer stack length. Control zone 280 is operated at a lower EM wave speed (i.e. lower frequency from its drive) than it was for curve 260, so all pre-stack deceleration takes place in this control zone. Control zone 280 and 282 operate at the same EM wave speed. Since there are more secondaries on the return side at this higher draw ratio, the stack length increases slightly as evidenced by the entrance end of the stack moving back along the loop from 288 on curve 260 to 284 on curve 262.

Curve 264 shows the effect of scaling the line speed up while maintaining the same draw ratio as curve 262. As a result of the higher speed, and therefore higher energy, of the carriages entering the return side, deceleration forces must be applied to the active and passive carriages sooner to achieve a low impact-speed before reaching the entrance end of the stack. Note that the percent energy dissipated in each control zone is increased to achieve this. This percent energy is the deceleration force F, which is the rated force developed on the hysteresis secondary, times the length over which deceleration occurs, delta L, (F×delta L); compared to the same force, F, acting for the total length of the zone, (F×L). If the control zones are unequal lengths, but operated at the same current levels, the total energy able to be dissipated in the longer control zones will be greater. Referring to curve 264, since the carriages decelerate over a longer length, delta L, in each control zone the percent energy dissipated is increased. As a result of this different deceleration profile, the stack end at 290 is shorter for curve 264 versus the stack end at 284 for curve 262, although both curves are for the same number of carriages on the return side. At the extremes, the entrance end of the stack must always occur before reaching the end of the last hysteresis control zone and before entering any synchronous control zone; and it must occur some distance after the carriages reach the last equilibrium speed. The last equilibrium speed is referred to as the stack overspeed. It should always be high enough that the carriages can rapidly catch up to the stack but low enough to keep the impact when hitting the stack below a level that causes damage to the active and passive carriages.

We claim:
1. An apparatus for drawing a web of plastic film by propelling individual carriages having tenter clips attached thereto at predetermined speeds in opposed loops defined by a pair of carriage guide tracks positioned opposite each other, using linear motors, such apparatus includes:
   first elongated primaries positioned opposite each other on forward sides of the loops;
   second elongated primaries positioned opposite each other on return sides of the loops;
   a plurality of active carriages guided around the tracks, each having a synchronous secondary attached thereto positioned adjacent the first primaries for propelling the active carriages, synchronously, in pairs, at predetermined speeds, in a film processing section of the tenter frame to draw the film gripped by the tenter clips;

each of the active carriages further having a hysteresis secondary attached thereto positioned adjacent the second primaries for propelling the active carriages in and through stack forming sections and into stacks of carriages on the return sides of the loops.

2. The apparatus of claim 1 wherein at least one passive carriage is positioned between each of the active carriages in each loop, each such passive carriage having a hysteresis secondary attached thereto positioned adjacent the second primaries for propelling the passive carriages in and through the stack forming sections and into the stacks of carriages on the return sides of the loops.

* * * * *